United States Patent
Jain et al.

(10) Patent No.: US 11,887,314 B2
(45) Date of Patent: Jan. 30, 2024

(54) COMPRESSED DOMAIN MOTION DETECTION

(71) Applicant: SmartThings, Inc., Minneapolis, MN (US)

(72) Inventors: Megha Jain, Brooklyn, NY (US); Sayre Blades, Madison, NJ (US); Jay Ridgeway, Falls Church, VA (US)

(73) Assignee: Smartthings, Inc., Minneapolis, MN (US)

( * ) Notice: Subject to any disclaimer, the term of this patent is extended or adjusted under 35 U.S.C. 154(b) by 0 days.

(21) Appl. No.: 17/521,842

(22) Filed: Nov. 8, 2021

(65) Prior Publication Data
US 2023/0147494 A1 May 11, 2023

(51) Int. Cl.
*G06V 20/70* (2022.01)
*G06T 7/223* (2017.01)
*G06V 20/40* (2022.01)
*G06V 10/74* (2022.01)
*G06N 5/01* (2023.01)

(52) U.S. Cl.
CPC ............. *G06T 7/223* (2017.01); *G06N 5/01* (2023.01); *G06V 10/761* (2022.01); *G06V 20/46* (2022.01); *G06V 20/48* (2022.01); *G06V 20/70* (2022.01)

(58) Field of Classification Search
CPC ........ G06T 7/223; G06V 20/70; G06V 20/46; G06V 10/761; G06V 20/48; G06N 5/01
See application file for complete search history.

(56) References Cited

U.S. PATENT DOCUMENTS

| | | | |
|---|---|---|---|
| 2007/0183504 A1* | 8/2007 | Hoffman | G06T 7/223 375/E7.113 |
| 2013/0156304 A1* | 6/2013 | Moorty | G06V 10/771 382/159 |
| 2015/0281715 A1* | 10/2015 | Lawrence | G06T 7/215 375/240.16 |
| 2019/0045207 A1* | 2/2019 | Chen | G06F 16/535 |
| 2019/0327486 A1 | 10/2019 | Liao et al. | |
| 2020/0327313 A1 | 10/2020 | Kedarisetti et al. | |

(Continued)

OTHER PUBLICATIONS

Szczerba, Krzysztof et al., 2009 Advanced Video and Signal Based Surveillance, Fast Compressed Domain Motion Detection in H.264 Video Streams for Video Surveillance Applications, 7 pages, 2009.

(Continued)

*Primary Examiner* — Syed Haider
(74) *Attorney, Agent, or Firm* — Merchant & Gould P.C.

(57) ABSTRACT

Methods and systems for detecting motion using video data from a smart camera device. In some embodiments, and by non-limiting example, this disclosure is directed to detecting motion in the compressed video domain. One aspect is a method comprising receiving compressed video data, extracting macroblocks and motion vectors for a plurality of frames in the compressed video data, identifying frame-level features for each of the plurality of frames based on the macroblocks and the motion vectors, calculating similarity features for each of the identified frame-level features based on the frame-level features identified in consecutive frames, and predicting motion for each of the plurality of frames by providing the frame-level features and the similarity features into a model trained to detect motion.

17 Claims, 25 Drawing Sheets

(56) References Cited

U.S. PATENT DOCUMENTS

2021/0089921 A1* 3/2021 Aghdasi .................. G06N 5/04
2022/0398747 A1* 12/2022 Lin ........................ G06T 7/277

OTHER PUBLICATIONS

Laumer, Marcus et al., VISAPP 2013—International Conference on Computer Vision Theory and Applications, Compressed Domain Moving Object Detection Based on H.264/AVC Macroblock Types, 10 pages, 2013.
Rosebrock, Adrian, PyImageSearch, Basic Motion Detection and Tracking With Python and OpenCV, 1 page, May 25, 2015.
Xu Jingxin et al.; An Efficient and Robust System for Multiperson Event Detection in Real-World Indoor Surveillance Scenes; IEEE Transactions on Circuits and Systems for Video Technology, IEEE, USA, vol. 25, No. 6, Jun. 2015, pp. 1063-1076.
PCT International Searching Authority; International Search Report and Written Opinion for application ho. PCT/US2022/079389, dated Feb. 23, 2023, 19 pages.

* cited by examiner

Motion Detection Application
124

Motion Detection Engine
202

Event Detection Engine
204

Receive frame-level features and similarity features
322

Input features into model trained to detect motion
324

Smooth predictions over a predetermined time
326

Motion Triggered Clip Upload

COMPRESSED DOMAIN MOTION DETECTION

BACKGROUND

Devices with cameras and network connectivity (e.g., smart camera devices) are common. These devices include security camera devices, child or pet monitoring devices, smart doorbells, mobile computing devices etc. Owners of these devices may be interested in using the camera to detect motion. For example, a home-surveillance video solution may use motion detection to notify a user when there is a possible disturbance or initiate an automation. Some existing solutions provide a live video stream and/or recorded video clips to a user.

Existing systems and methods using cameras for motion detection are computationally expensive and often do not run effectively on many smart camera devices. For example, the systems and methods may be slow on smart camera devices which are under-powered or have low-end camera hardware. Additionally, existing algorithms typically generate many false-positives. For example, notifying a user of detected motion when lighting changes or for an inanimate object/background motion, such as trees swaying in the wind.

SUMMARY

In general terms, this disclosure is directed to methods and systems for detecting motion using video data in the compressed domain. In some embodiments, and by non-limiting example, this disclosure is directed to using a smart camera device to record and encode video where motion is detected using the compressed video data.

One aspect is a method comprising receiving compressed video data, extracting macroblocks and motion vectors for a plurality of frames in the compressed video data, identifying frame-level features for each of the plurality of frames based on the macroblocks and the motion vectors, calculating similarity features for each of the identified frame-level features based on the frame-level features identified in consecutive frames, and predicting motion for each of the plurality of frames by providing the frame-level features and the similarity features into a model trained to detect motion.

Another aspect includes one or more non-transitory computer-readable storage devices storing data instructions that, when executed by at least one processing device of a system, cause the system to receive compressed video data, extract macroblocks and motion vectors for a plurality of frames in the compressed video data, identify frame-level features for each of the plurality of frames based on the macroblocks and the motion vectors, calculate similarity features for each of the identified frame-level features based on the frame-level features identified in consecutive frames, and predict motion for each of the plurality of frames by providing the frame-level features and the similarity features into a model trained to detect motion.

A further aspect is a smart camera device, the smart camera device comprising a processor, and a memory storage device, the memory storage device storing instructions that, when executed by the processor, cause the smart camera device to receive compressed video data, extract macroblocks and motion vectors for a plurality of frames in the compressed video data, identify frame-level features for each of the plurality of frames based on the macroblocks and the motion vectors, calculate similarity features for each of the identified frame-level features based on the frame-level features identified in consecutive frames, and predict motion for each of the plurality of frames by providing the frame-level features and the similarity features into a model trained to detect motion.

BRIEF DESCRIPTION OF THE DRAWINGS

FIG. 3 illustrates an example motion detection application.

DETAILED DESCRIPTION

Figure 1:
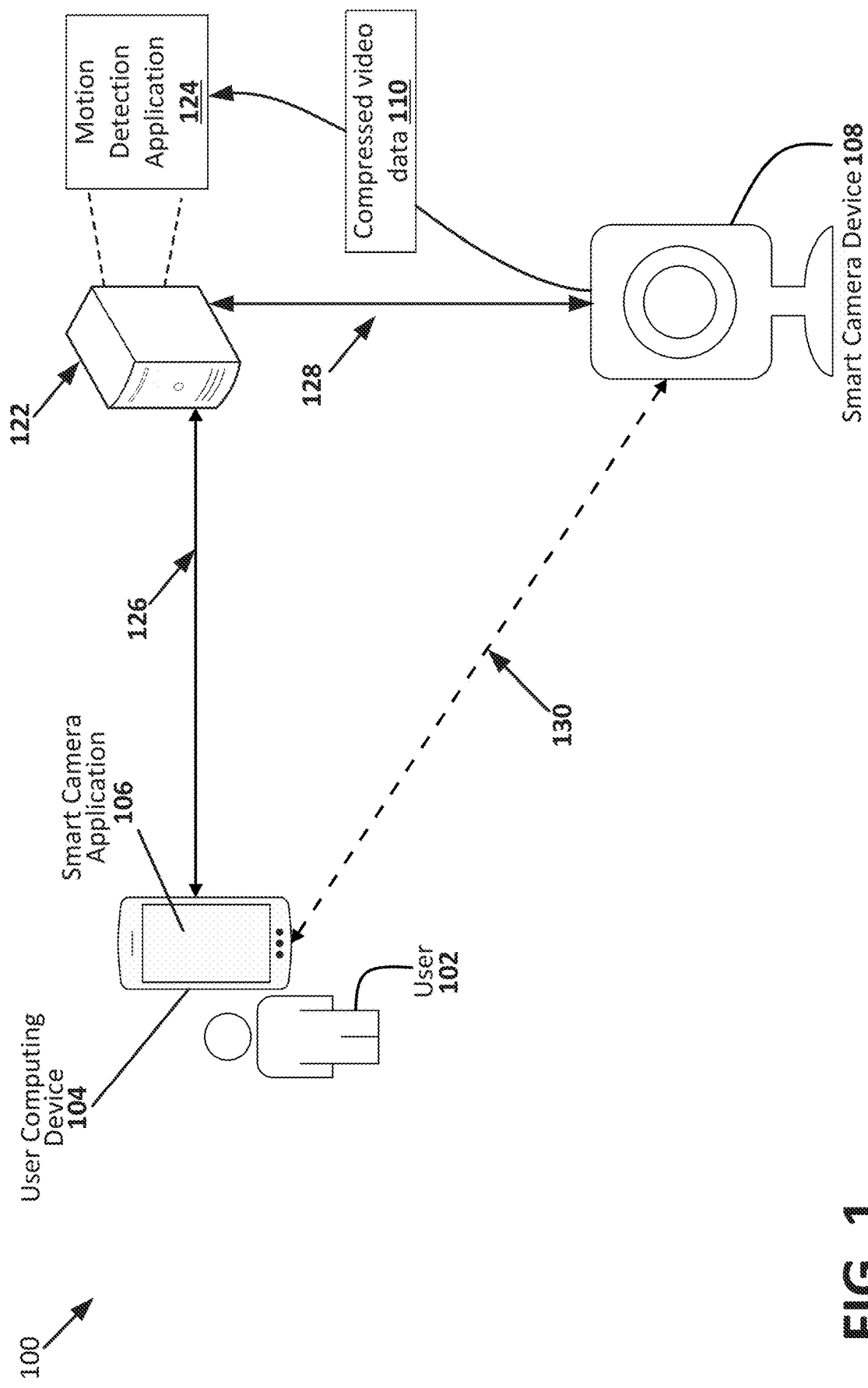
FIG. 1 illustrates an example environment for detecting motion at a smart camera device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to methods and systems for detecting motion using video data in the compressed domain. In some embodiments, and by non-limiting example, this disclosure is directed to using a smart camera device to record and encode video where motion is detected using the compressed video data. Some advantages of the embodiments disclosed herein include reducing the number of false positives (e.g., detecting motion in frames without interesting motion or only background motion), reducing the amount of video recorded due to the reduction of false positives, minimizing cloud costs associated with storing and delivering recorded video, processing video data to detect motion without the use of specialized services for decoding video, and providing video clips of events with valuable information.

In some embodiments, the video data is compressed with the H.264/AVC video compression standard. Under this standard each frame in a video sequence is divided into several slices, with each slice further divided into macroblocks. The macroblocks have a size of 16 by 16 pixels. Each macroblock is encoded according to a rate-distortion optimization (RDO). The RDO encodes each macroblock into one of several different macroblock types of different classes. For example, one class is an intra-frame class where the macroblock is predicted from its previously encoded neighbors and other classes use inter-frame predictions which exploit similarities between frames. Additionally or alternatively, some of the compressed video standards use temporal correlation between frames. For example, each macroblock may have an associated motion vector. The motion vector describes displacement of the associated macroblock on the current frame from a reference frame.

FIG. 1 illustrates an example environment 100 for detecting motion at a smart camera device 108. The environment includes a user 102, a user computing device 104 with a smart camera application 106, a smart camera device 108, and a server 122 having a motion detection application 124.

The user 102 operates the user computing device 104 to use the smart camera application 106. In some embodiments, the user 102 is an administrative user or is the owner of the smart camera device 108. The user 102 operates the user computing device 104 to interact with the smart camera application 106.

The user computing device 104 is connected to the smart camera device 108 via a network, or is brokered and relayed through a server. Examples of user computing device 104 include mobile computing devices, such as a smartphone, tablet, smart watch, etc., and other computing devices, such as laptops, desktops, smart speakers, etc. An example of a computing device 540 is illustrated and described in FIG. 18. The user computing device 104 receives inputs from the user 102 to operate various applications including the smart camera application 106. In the example shown, the user computing device connects with the server 122 via a communication channel 126.

In some embodiments, the user computing device 104 includes a smart camera application 106. The smart camera application 106 allows a user to view clips recorded on the smart camera device 108. In some embodiments, the smart camera application 106 displays a video live stream from the smart camera device 108. In some embodiments, the smart camera application 106 includes a menu of settings which a user can configure. For example, the smart camera application 106 may have a setting selection for enabling motion detection at the smart camera device 108. Example user-interfaces of the smart camera device are illustrated and described in reference to FIGS. 13-17.

A smart camera device 108 is a camera with network connectivity. Examples of smart camera devices include smart doorbell with camera, outdoor security camera, indoor security camera, smart pet monitor, smart baby monitor, etc. The smart camera device 108 includes network connectivity hardware and software which allows the smart camera device 108 to connect to the server 122 (e.g., via a communication channel 128). In some examples, the smart camera device 108 connects to the network via a hub or edge access device located in proximity to the smart camera device 108 (e.g., via a Bluetooth connection). In some examples, the smart camera device includes a wired connection to a device which is able to connect with the network. In some embodiments, the smart camera device 108 and the user computing device 104 are able to connect directly using a wireless or wired communication protocol (communication channel 130). For example, the user computing device 104 may connect to the smart camera device 108 directly using Bluetooth®. In many embodiments, the smart camera device includes a processor, memory, and other storage which allows the smart camera device 108 to execute some of the features described herein. An example of the smart camera device 108 is illustrated and described in reference to FIG. 2.

The server 122 can be one or more servers containing one or more processors and one or more storage mediums. The server 122 is configured to connect to various computing devices including the user computing device 104 (via the communication channel 126) and the smart camera device 108 (via the communication channel 128). In some examples, the smart camera device 108 and the user computing device 104 communicate with the server over a public network, such as the internet. In some embodiments, these communications use a wireless cellular network. In the example shown, the server 122 operates the motion detection application 124. An example of a computer architecture which, in some examples, are included in the server 122 is illustrated and described in reference to FIG. 18.

Although FIG. 1 shows a single server 122 some embodiments include multiple servers. In these embodiments, each of the multiple servers may be identical or similar and may provide similar functionality (e.g., to provide greater capacity and redundancy, or to provide services from multiple geographic locations). Alternatively, in these embodiments, some of the multiple servers may perform specialized functions to provide specialized services (e.g., including the motion detection application). Various combinations thereof are possible as well.

In some embodiments, the server operates a motion detection application 124. In some examples the motion detection application operates on the user computing device 104 or the smart camera device 108. The motion detection application 124 receives compressed video data 110 from the smart camera device 108. The motion detection application 124 processes the compressed video data 110 to determine whether any frames in the video data contain motion. In some embodiments, the motion detection application detects event boundaries and compiles frames of interest based on the event boundaries of detected motion to create video clips of an event of interest. These events are provided to the smart camera application 106. Examples of the motion detection application 124 are illustrated and described herein.

In a typical example, the smart camera device 108 records video. The recorded video is encoded using any one of a variety of video encoding protocols. For example, the smart camera device 108 may convert the video data to the H.264 format (transforming the recorded video data to the compressed video data 110). In some embodiments, the compressed video data 110 is encrypted before being sent to the server 122, where the motion detection application 124 receives the compressed video data. The motion detection application 124 uses the compressed video data to detect motion and event boundaries. This information is used to provide clips of captured events to the user via the smart camera application 106. In some examples, the motion detection application 124 is executed on the smart camera device 108.

Figure 2:
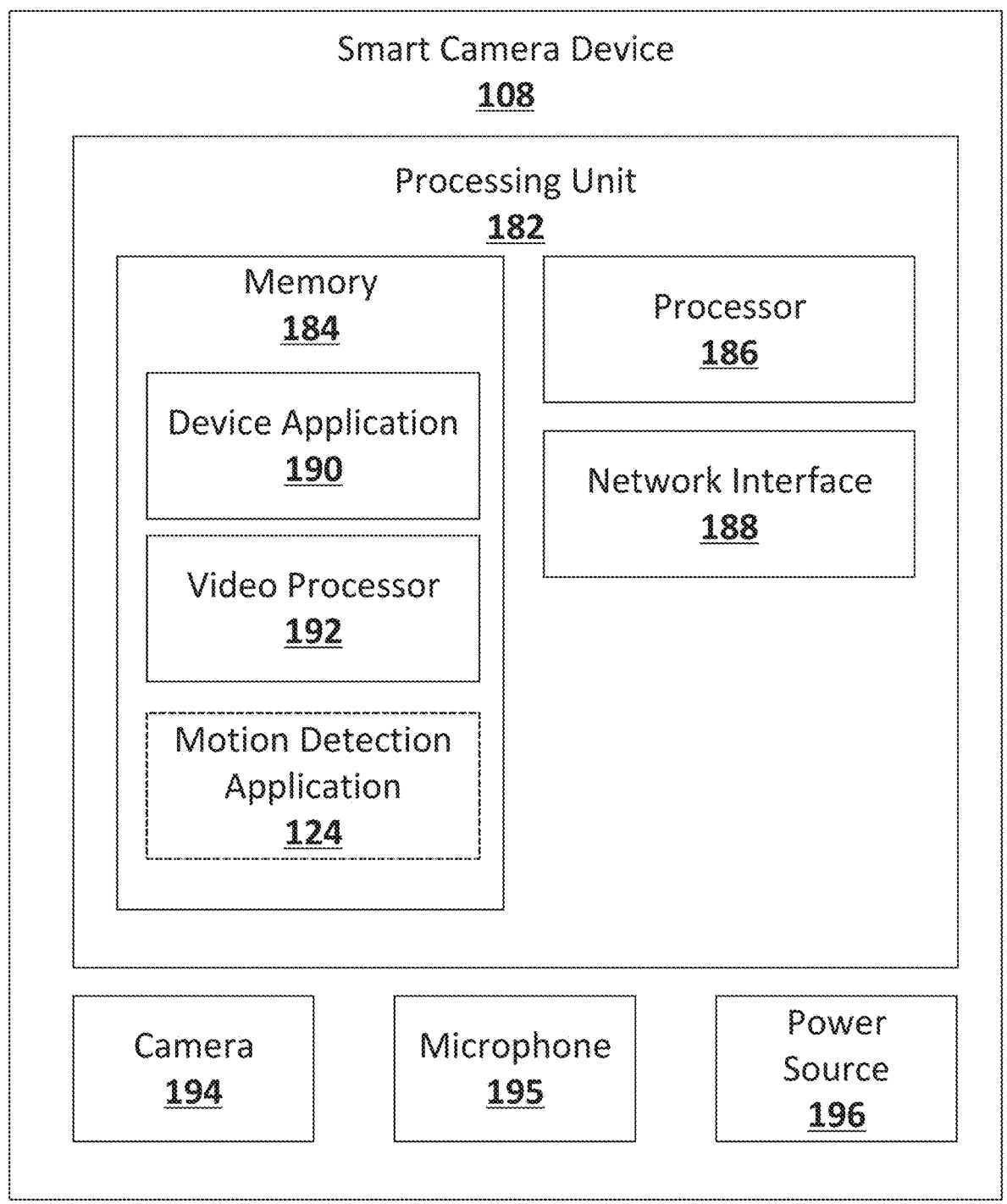
FIG. 2 illustrates an example smart camera device.

FIG. 2 illustrates an example smart camera device 108. The smart camera device includes a processing unit 182, a camera 194, a microphone 195, and a power source 196. The processing unit 182 includes a memory 184, a processor, and a communication interface. The memory includes a device application 190, a video processor 192, and a motion detection application 124. In some embodiments, the camera further includes specialized processing units to execute parts of the device application 190 and/or the motion and event detection methods described herein. Examples of specialized processing units include video processing units, graphical processing units (GPUs), tensor processing units (TPUs), neural processing units (NPUs), and digital signal processing (DSP) units.

The smart camera device includes the processing unit 182. The processing unit 182 operates to control the smart camera device, process video data, and communicate with other devices via a network. In some examples, the processing unit 182 also operates a motion detection application 124.

The processing unit includes a memory 184, a processor 186, and a network interface 188. Examples of the memory (564) 184, processor 186 (processing device 554), and network interface 188 (558) are illustrated and described in reference to FIG. 18.

The memory 184 includes a device application 190. The device application 190 operates the various functions of the smart camera device 108. For example, the device application may include instructions for when video should be recorded, when different components of the smart camera should be activated (e.g., turning on the camera 194 or the microphone 195), providing battery status updates, initiating automations, etc.

The memory 184 includes a video processor 192. The video processor operates to process the video data. In some embodiments, the video processor encodes the video data to the compressed domain. In typical embodiments, the video data is encoded in the H.264 format. In other examples, the video is encoded in the fragmented MP4 playback format. In some embodiments, the audio is encoded in the Advanced Audio Coding (AAC) format. Other embodiments can include other formats. In some embodiments, the video processor encrypts the compressed video data and audio data.

In some embodiments, the memory 184 includes a motion detection application 124. In some of these embodiments, the motion detection application is optimized to run on a smart camera which includes limited processing capacity. An example of the motion detection application 124 is illustrated and described in FIG. 3.

The camera 194 is a digital camera which contains sensors to detect light which is processed and stored as recorded images, series of images, or video (series of images or frames).

The microphone 195 operates to record audio in conjunction with the camera 194 recording video. In some embodiments, the smart camera device 108 does not include a microphone 195.

The power source 196 powers the smart camera device 108. In some embodiments, the power source 196 is one or more batteries. In other examples, the smart camera device includes an AC power plug or other electrical connection. Other power sources can also be used.

In further embodiments, the smart camera device 108 may further include a motion sensor. For example, a passive infrared motion sensor (PIR sensor).

FIG. 3 illustrates an example motion detection application 124. The motion detection application 124 includes motion detection engine 202 and event detection engine 204. The motion detection application 124 is another example of the motion detection application 124 illustrated and described in FIGS. 1 and 2.

The motion detection application 124 operates on received compressed video, predicts which frames include motion, and, in some embodiments, predicts event boundaries. Using this information, the motion detection application 124 sends clips of interest to users. In some embodiments, the motion detection application is further configured to notify a user when there is a possible disturbance or initiate automations for a user.

In some embodiments, the motion detection application 124 includes a motion detection engine 202. The motion detection engine operates to identify foreground objects moving relative to a static background. In many embodiments, the video data includes background motion which is not of interest. For example, a tree swinging slightly in the wind, lighting fluctuations, weather, movement of a fan or other static object. The motion detection engine operates to avoid identifying background motion which is not of interest. The motion detection engine operates to detect motion in recorded video while the video data is in the compressed domain. In some embodiments, to reduce noise the motion prediction engine looks at similarity of features in adjacent frames. In some embodiments, the motion detection engine 202 uses a model, such as a machine learning model, to detect motion. Example methods for detecting motion in compressed video are described herein.

In some embodiments, the motion detection engine 202 detects motion by differentiating and identifying foreground objects moving relative to a static background. In these embodiments, the motion detection engine 202 must first identify objects in motion and reduce false-positive background detections. In some embodiments, this is done by differentiating between an object in motion (e.g., a person walking across the frame) and global or background motion (the appearance of motion caused by, for example, lighting fluctuations, weather, and movement of static objects such as a fan or tree).

In some embodiments, the motion detection application 124 includes an event detection engine 204. The event detection engine 204 operates to detect event boundaries. In some embodiments, event boundaries are detected based on features derived from the compressed video data, calculated as a post processing step on frame predictions, or a combination of both. In some embodiments, the event detection engine 204 uses a model, such as a machine learning model, to make event predictions. An example method for detecting events is illustrated and described in reference to FIG. 10.

Figure 4:
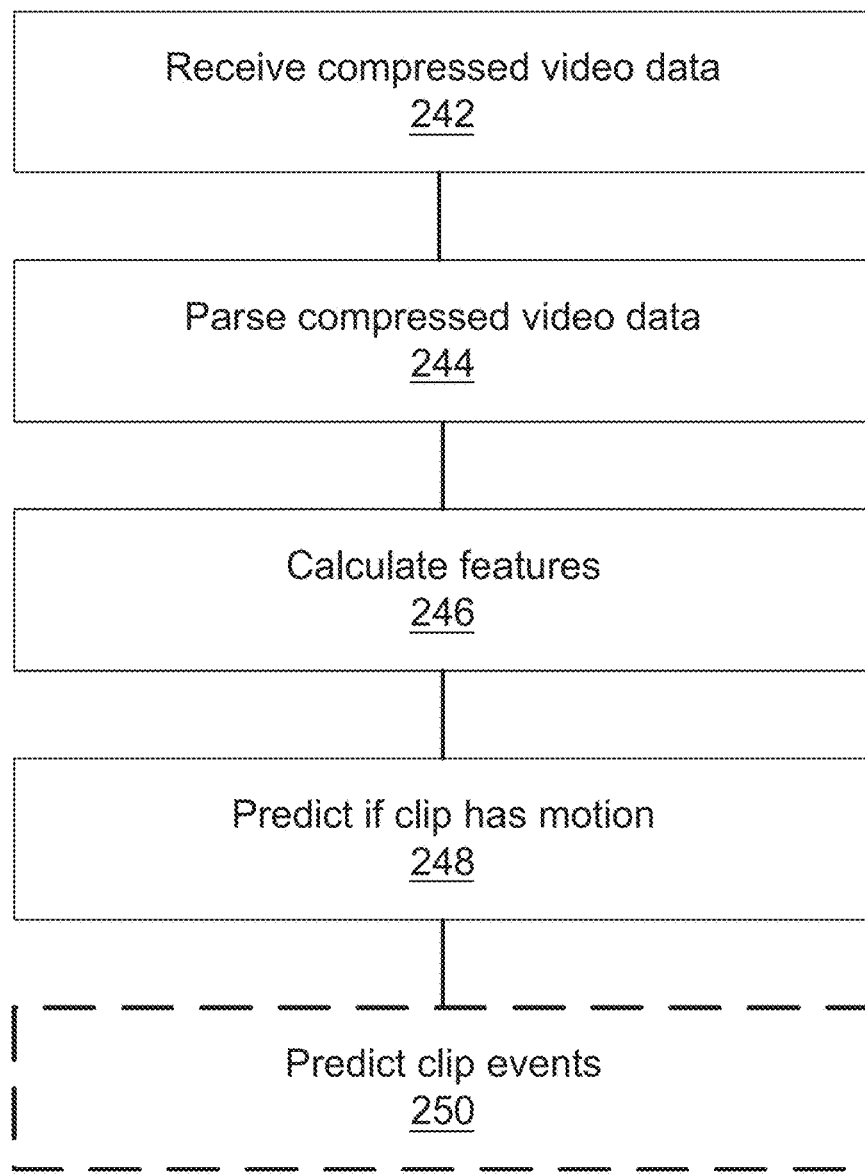
FIG. 4 illustrates an example method for detecting motion using compressed video data from a smart camera device.

FIG. 4 illustrates an example method 240 for detecting motion using compressed video data from a smart camera device. The method 240 includes the operations 242, 244, 246, 248, and 250. In some examples, the motion detection application 124, illustrated in FIG. 3, contains instructions which when executed by one or more processors cause a system, device (e.g., a local computing hub in the smart camera device 108 environment), or smart camera to perform the method 240.

The operation 242 receives compressed video data. In some embodiments, receiving compressed video data includes receiving a H.264 byte stream of compressed video data. In some examples, the video data is received from a smart camera, however, the compressed video data can be received from any type of device which is able to record video.

The operation 244 parses the compressed video data. In some examples, the compressed video data is received in Network Abstraction Layer units (NALU). Each unit of the received NALU is checked to determine if it is a Video Coding Layer (VCL) unit. If the NALU unit is a VCL unit, the operation 244 further extracts motion vectors and macroblocks. In some embodiments, the operation 244 further identifies video frames. In some embodiments, a sampled subset of frames is parsed from the compressed video data. For example, the sampled subset may include parsing every third frame. Other examples include dividing up the frames in groups (e.g., of 5 consecutive frames) and randomly selecting a frame from each group, etc. Other methods for taking a sampled subset of frames can also be used. Parsing a subset of frames may improve performance by reducing the number of frames for processing (e.g., at the operation 246). An example method of the operation 244 is illustrated and described in reference to FIG. 5.

The operation 246 calculates features in the parsed compressed video data. Examples of features which are calculated at the operation 246 include motion vector features, macroblock features and similarity features. Combinations of these features can be used in different embodiments. An example method for the operation 246 is illustrated and described in reference to FIG. 6.

The operation 248 predicts whether the clip has motion. In some examples, the extracted motion vectors, macroblocks, and calculated features are provided to a model which is trained to detect motion. In some embodiments, the model is a random forest model. In some examples, the predictions are smoothed over a window of a predetermined duration. An example method for the operation 248 is illustrated and described in reference to FIG. 7. An example method 340 for training a model to detect motion is illustrated and described in reference to FIG. 8.

In some embodiments, the method 240 includes the operation 250 and in other embodiments, the operation 250 is optional or not included. The operation 250 predicts clip events. In one embodiment, the operation 250 receives at least one of: (1) the extracted macroblocks and motion vectors; (2) the calculated features; and (3) the frames with predicted motion and provides this information to a model which is trained to predict event boundaries. In some examples, this model is an event-trained random forest model. In some embodiments, these predictions are smoothed over a window of a predetermined duration time. After predicting event boundaries, the operation 250 groups the motion predicted frames into events. In one example, this group is based on the criteria that the length of the predicted event is greater than a threshold (e.g., a period of time or number of frames) and that the gap between frames detected to contain motion is less than a threshold (e.g., a second period of time or second number of frames). An example method 250 of the operation 250 is illustrated and described in reference to FIG. 10.

Figure 5:
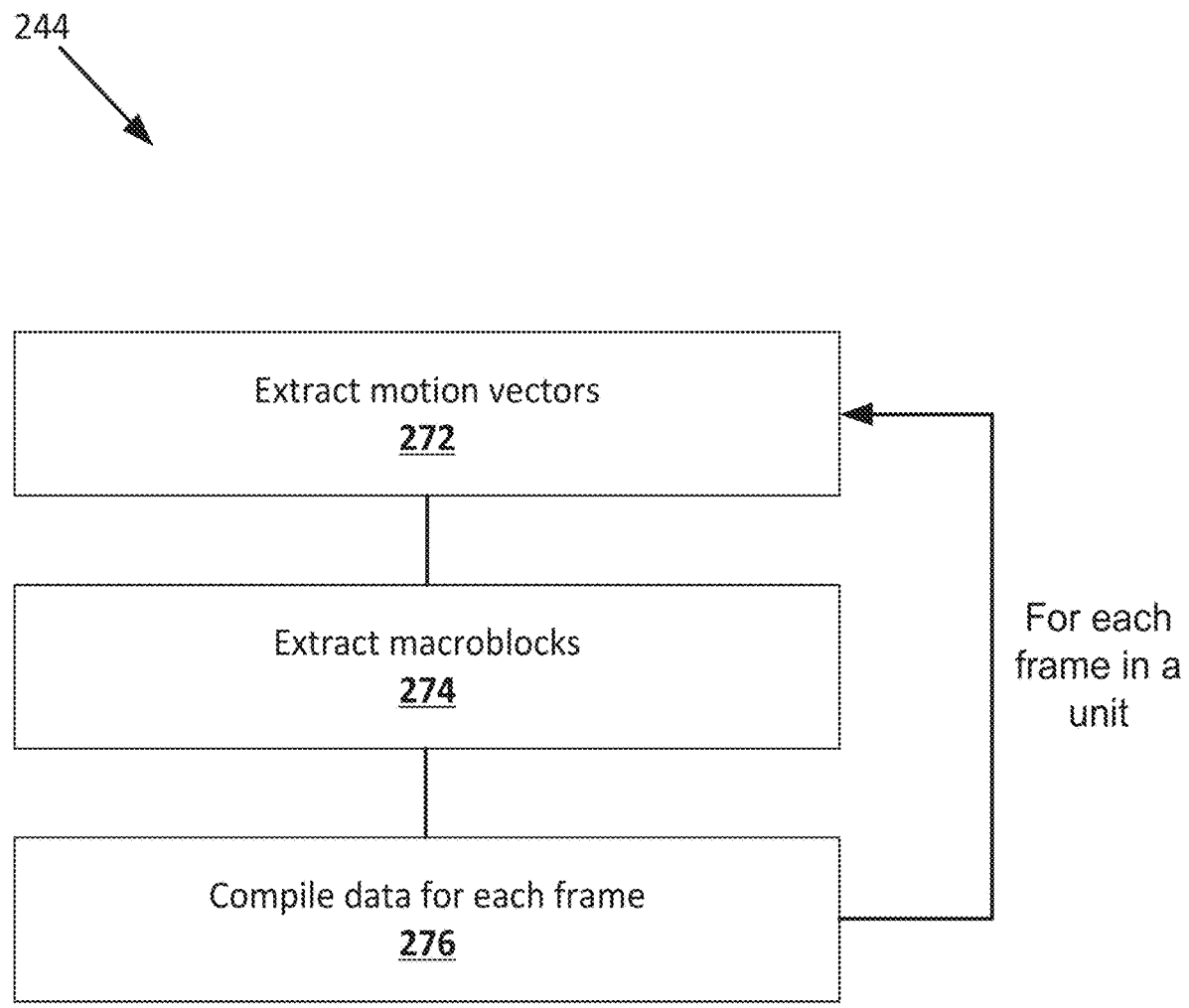
FIG. 5 illustrates an example method for parsing compressed video data.

FIG. 5 illustrates an example method 244 for parsing compressed video data. The method 244 is one example of the operation 244 illustrated and described in reference to FIG. 4. The method 244 includes the operations 272, 274, and 276.

The operation 272 extracts motion vectors from the received compressed video data. The operation 274 extracts macroblocks from the received compressed video data. Because the motion vectors and macroblocks are compressed domain features, the operations 272 and 274 are able to extract the motion vectors and macroblocks without decoding the video. In typical embodiments, a NALU is received, and for each NALU which is a VCL the operations 272 and 274 go frame by frame extracting features and compiling the features for each frame at the operation 276.

Figure 6:
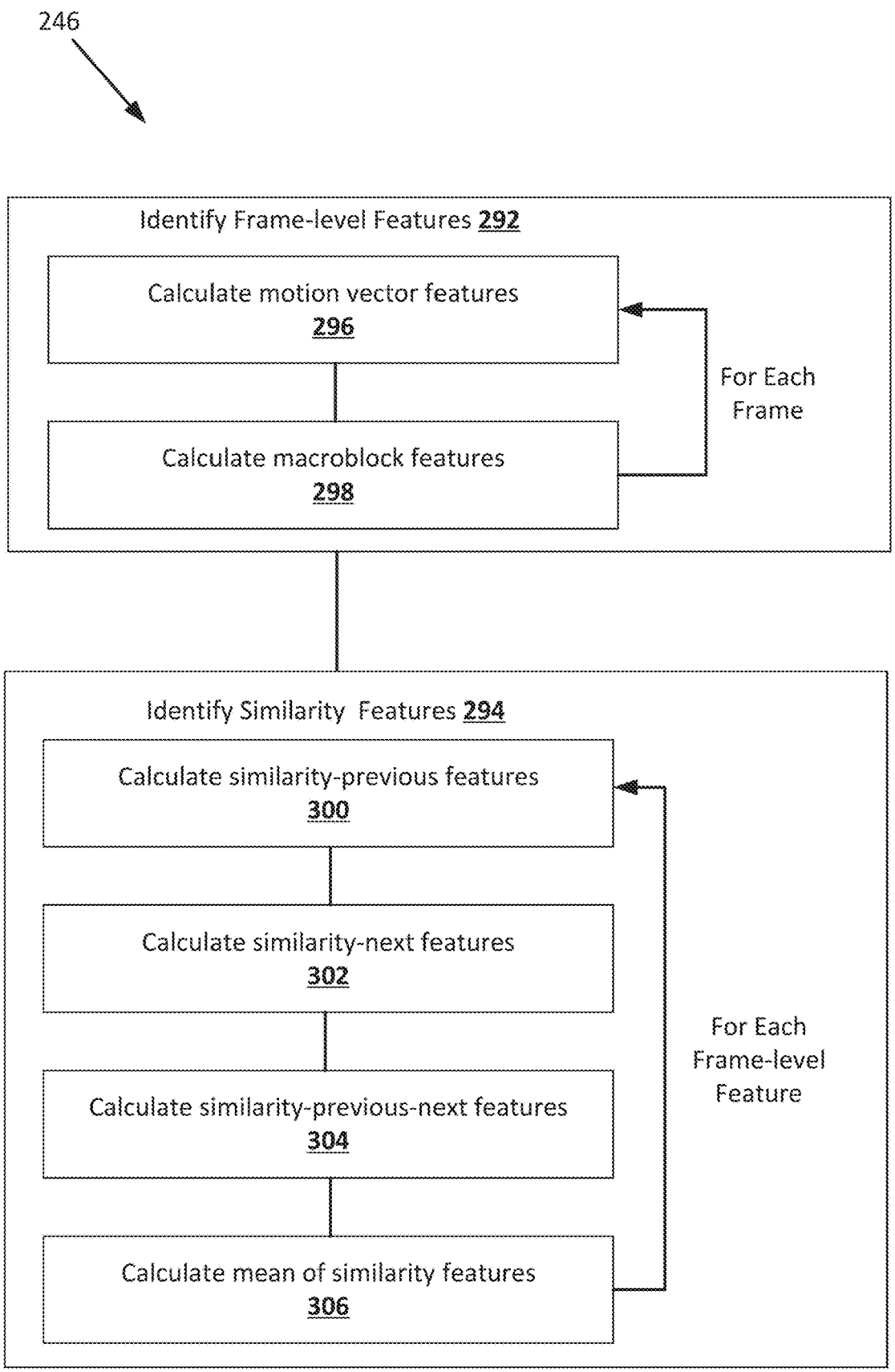
FIG. 6 illustrates a method for calculating features in the parsed compressed video data.

FIG. 6 illustrates a method 246 for calculating features in the parsed compressed video data. The method 246 is one example of the operation 246 illustrated and described in reference to FIG. 4. The method 246 includes the operations 292 and 294.

The operation 292 identifies frame level features. The operation 292 calculates features for each frame using the frame data extracted using the method 244 (illustrated in FIG. 5) or the operation 244 (illustrated in FIG. 4). In some embodiments, the operation 292 takes the extracted frame data for a sampled subset of frames to identify the frame-level features for each frame in the subset of frames. The operation 292 includes the sub-operations 296 and 298.

The sub-operation 296 calculates motion vector features. The motion vector features are calculated using the extracted motion vectors from the compressed video data. For example, motion vector features are calculated by analyzing the density of the motion vectors and the magnitude of one or more motion vectors in the frame. In some embodiments, motion vector features are calculated by clustering motion vectors in the frame. Other methods for calculating motion vector features are also within the scope of this disclosure.

The sub-operation 298 calculates macroblock features. The macroblock features are calculated using the extracted macroblocks from the compressed video data. For example, features can be calculated by comparing adjacent macroblocks. In some examples, further macroblocks are compared or all macroblocks are compared and with weighted values based on a distance between the macroblocks. Other methods for calculating macroblock features are also within the scope of this disclosure.

The method 244 illustrated and described in FIG. 5 could work simultaneously with the operation 292. For example, for each frame in a received unit, the motion vectors are (1) extracted (operation 272), (2) the motion vector features are calculated from the extracted motion vectors (the sub-operation 296), (3) the macroblocks are extracted (operation 274), (4) the macroblock features are calculated from the extracted macroblocks (the sub-operation 298), and (5) the data for the frame is compiled (276). This process may provide advantages such as a lower computation complexity (allowing for the algorithm to run with less resources) or simplifying the implementation. This process is repeated for each frame. Other ordering of the operations or combination of operations are also possible.

The operation 294 identifies similarity features. In some embodiments, the similarity features are calculated for each of the identified frame-level features based on the frame-level features identified in consecutive frames, or consecutive frames in the sampled subset of frames. In some embodiments, the operation 294 includes initializing a frame buffer. In some of these examples, a window size is predetermined and a window sized buffer for frames previous to the current frame and a window sized buffer of frames after the current frame are retrieved (totally two times the window size). In some embodiments, the window size is predetermined. The operation 294 includes the sub-operations 300, 302, 304, and 306.

The sub-operation 300 calculates similarity-previous features. The similarity-previous features are calculated by comparing the features in the current frame to the features calculated in previous frames. In one embodiment, the similarity-previous features are calculated by shifting and multiplying the features from the previous frames. In some examples, the previous frames are limited to the frames within the window size to the current frame.

The sub-operation 302 calculates similarity-next features. The similarity-next features are calculated the same way as the similarity-previous features just using the next frames from the current frame (the frame of the current feature) instead of the previous frame. The similarity-next features are calculated by comparing the features in the current frame to the features calculated in the next frames (future frames). In some embodiments, the similarity-next features are calculated by shifting and multiplying features from the next window size of frame (future frames).

The sub-operation 304 calculates similarity-previous-next features. The similarity-previous-next features are calculated to compare the previous frames with the next frames. In some embodiments, the similarity-previous-next features are calculated by shifting and multiplying features from the window size of previous frames to the window size of next frames (future frames).

The sub-operation 306 calculates mean of similarity features. In some embodiments the sub-operation 306 calculates the mean of the similarity-previous features (calculated at sub operation 300), the similarity-next features (calculated at sub operation 302), and the similarity-previous-next features (calculated at sub-operation 304).

The similarity features (calculated at the operation 294) are compiled with the frame-level features (calculated at the operation 292) and provided to a model for predicting motion. In some embodiments, the compiled features are also used to predict events.

Figure 7:
FIG. 7 illustrates an example method for predicting whether a clip has motion.

FIG. 7 illustrates an example method 248 for predicting whether a clip has motion. The method 248 is an example of the operation 248 illustrated and described in reference to FIG. 4. The method 248 includes the operations 322, 324, and 326.

The operation 322 receives frame-level features and similarity features. The frame-level features and similarity features are calculated using the method 246 illustrated and described in reference to FIG. 6.

The operation 324 inputs features into a model trained to detect motion. In some embodiments, the model is a random forest model trained on frame-level features. Other machine learning techniques are used in alternative embodiments. An example method of training a model to predict frames with motion is illustrated and described in reference to FIG. 8. In some examples, the features are smoothed before the data is provided to the model in the operation 324.

The operation 326 smooths predictions over a time window (over a 5 second window). In some embodiments, the predictions are smoothed for a window of a predetermined duration (e.g., a 5 second window, or a 10 second window, etc.). Smoothing predictions over a time window filters noise from the predictions.

After smoothing the predictions, the method 248 makes motion predictions for each frame. In some embodiments, a notification is sent to one or more users when motion is predicted. In other examples, the motion predictions are used to send video clips of the motion to a user. In further examples, the motion predictions are used to make event predictions with the event prediction used to make event video clips which are provided to a user.

Figure 8:
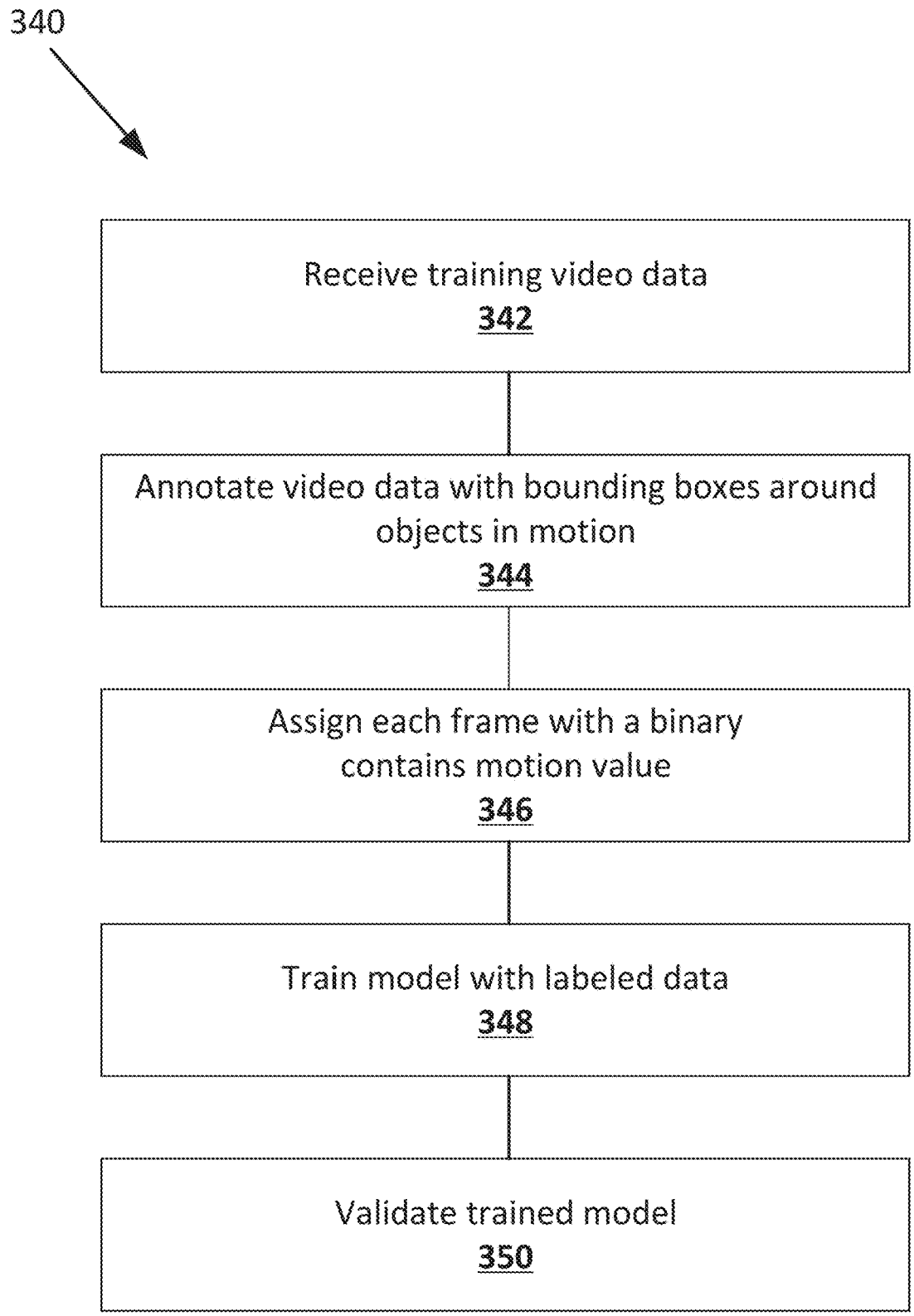
FIG. 8 illustrates an example method for training a model to detect motion in the compressed video domain.

FIG. 8 illustrates an example method 340 for training a model to detect motion in the compressed video domain. The method 340 includes the operations 342, 344, 346, 348, and 350.

The method 342 receives training video data. In some embodiments, the data is collected from a variety of cameras capturing different scenes. For example, outdoor scenes, indoor scenes, scenes with lots of background motion, etc. The data can be collected from any type digital camera with video recording capabilities.

The operation 344 annotates video data with bounding boxes around objects in motion. In some embodiments, the video data the operation 344 is done manually by a user. In some of these embodiments, one person labels the data and a second person reviews the labeled data, the reviewer can further adjust labeling for consistency across different labelers. In other examples, the operation 344 is done automatically using a computer vision application which is able to identify and track objects (video data which is not in the compressed domain). The bounding boxes track the objects in motion across the scenes and not background objects. For example, the bounding box will track a human walking, car driving, dogs running but will not track flags moving, trees moving, wind, ceiling fans, snow falling, etc. In some embodiments, the annotations further label occluded motion (e.g., objects that were in motion but stop). In some embodiments, once the labeling is complete a file is generated with the frame-level bounding box locations and attributes which is provided to the operation 346.

The operation 346 assigns each frame with a binary "contain motion" value. In some embodiments, the operation 346 uses a script which takes the file generated at the operation 344 and determines whether each frame contains motion. This determination is associated with the corresponding frame. In some examples a binary "contains motion" value is used. For example, if the clip contains motion the binary contains motion is 1 otherwise the value is 0. In some embodiments, the operation 346 finds frames with non-occluded objects in motion and groups these frames which occur close in time with each other into events, and in other instances filters out frames that are intermittent to produce the final dataset used for training the model.

The operation 348 trains the model with the labeled data. The model is trained to determine which features in the provided data indicate that a frame contains motion. For example, the labeled data is trained to map input features to a probability of a frame containing motion. In some examples, the model is trained using a random forest. Other supervised or unsupervised machine learning algorithms can also be used.

The operation 350 validates the trained model. In some embodiments, the model is trained with training data and validated with validation data. In some embodiments, the validation data is similarly processed to the training data, with only the compressed video data being provided to the model. The predictions output by the model are compared with the withheld contains motion value (sometimes referred to as the motion truth value) to determine prediction quality.

In some embodiments, the operation 350 uses k-fold cross validation. In these examples, the model is trained on one or more sessions. Each session represents a collection of clips from a unique location. These session are divided into three different splits of training data and validation data. A final test score is generated from the multiple different splits, where the average test score is used to validate the model.

Figure 9:
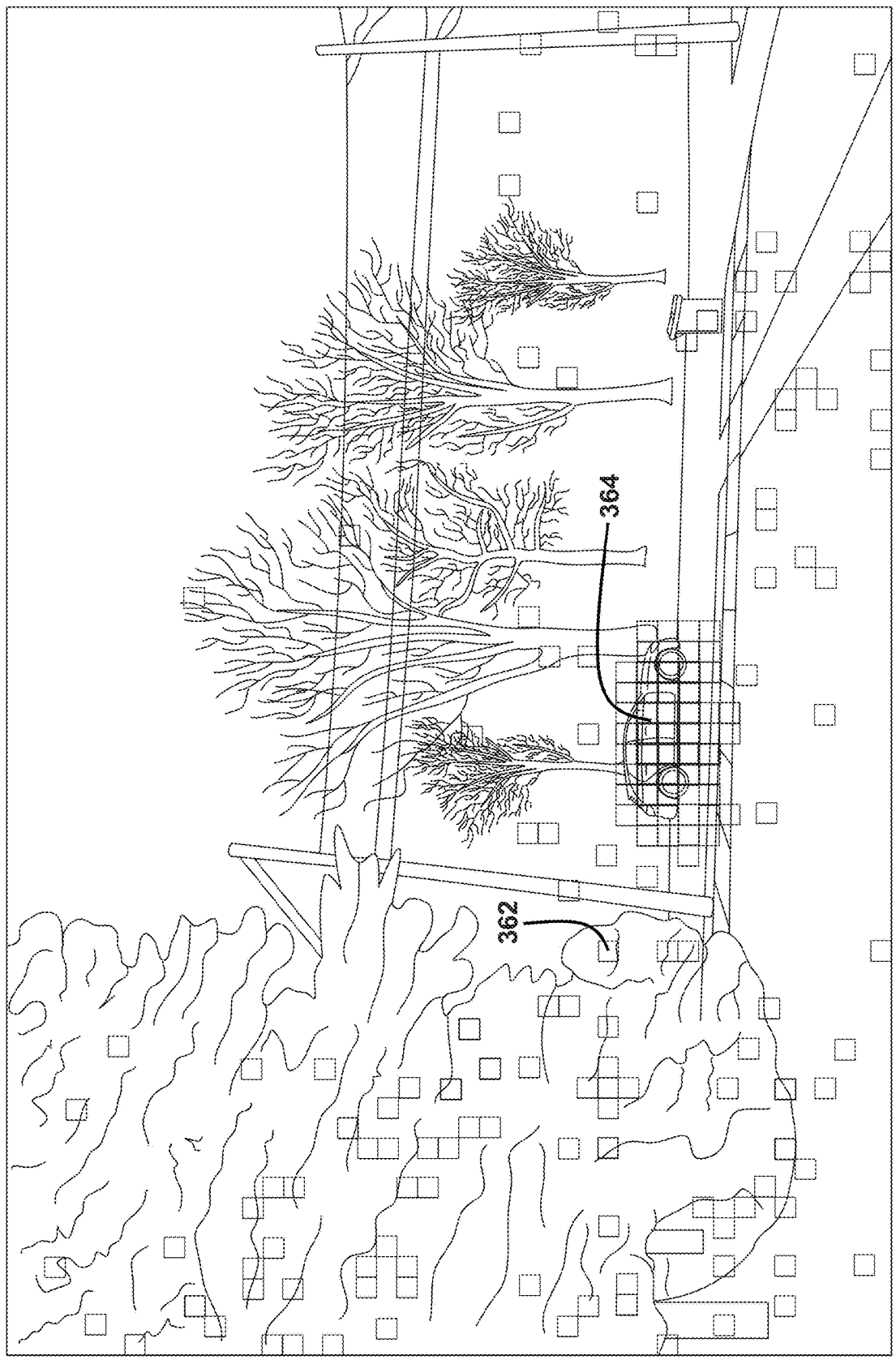
FIG. 9 illustrates macroblocks identified as having motion over an image of a scene.

FIG. 9 illustrates macroblocks with detected motion over an image of a scene. The image of the scene is included for illustrative purposes. Generally, FIG. 9 illustrates differentiating background noise (e.g., windy tree, sunlight) from a moving object (e.g., a car). In the example shown, macroblocks with detected background noise are depicted, for example, at macroblock 362, and object motion is depicted, for example at macroblock 364. In some embodiments, the motion detection engine 202 is configured to detect the moving objects without detecting the background noise, for example using the method 246 illustrated and described in reference to FIG. 6.

Figure 10:
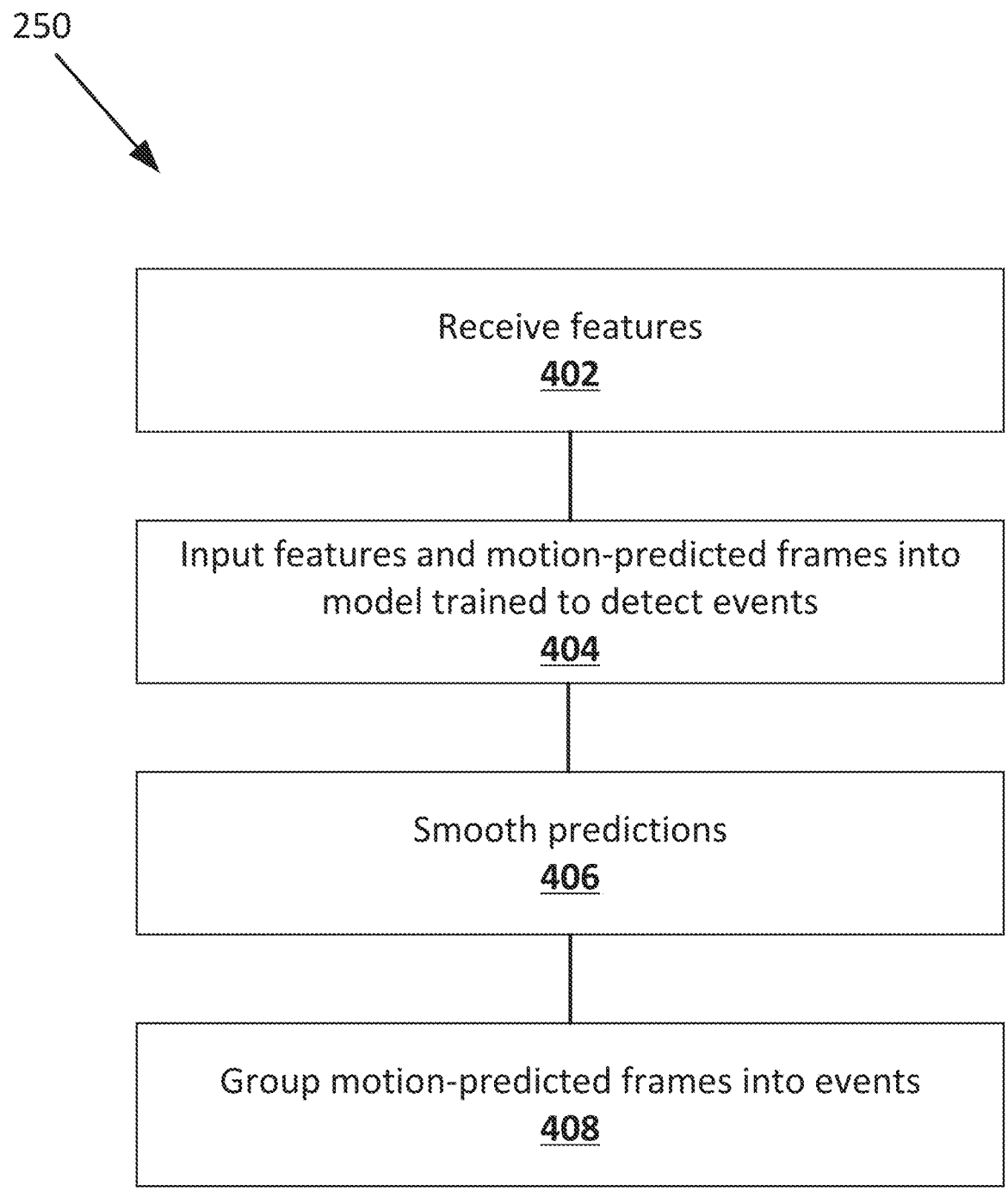
FIG. 10 illustrates an example method for predicting clip events.

FIG. 10 illustrates an example method 250 for predicting clip events. The method 250 is another example of the operation 250 illustrated and described in reference to FIG. 4. The method 250 includes the operations 402, 404, 406 and 408. In some embodiments, the event detection engine 204 illustrated and described in reference to FIG. 3 includes instructions which when performed by one or more processors cause a computing system (server, cloud computing system), device, or smart camera to perform the method 250.

The operation 402 receives features. In some examples, the received features include the frame-level features and similarity features calculated using the method 246 illustrated and described in reference to FIG. 6. In some embodiments, the received features include just the frame level features.

The operation 404 inputs features and motion-predicted frames into a model trained to detect events. In some embodiments, the model is an event-trained random forest model. Other machine learning techniques can also be used in alternative embodiments. In some embodiments, the model is trained to predict event boundaries (e.g., an event start time/frame and an event end time/frame).

The operation 406 smooths the event predictions. In some examples, the predictions are smoothed over a predetermined duration (e.g., a time window). In some embodiments, smoothing predictions removes noise from the predictions.

The operation 408 groups motion-predicted frames into events. Frames within the event boundaries are grouped into an event. In some embodiments, this event is provided to a user. In some embodiments, motion-predicted frames (e.g., frames predicted to have motion by the method 248 of FIG. 7 or the motion detection engine 202 of FIG. 3) are grouped into an event. In some embodiments, the motion-predicted frames are grouped into events based on the following criteria: (1) the length of the predicted event must be greater than a threshold (period of time or number of frames); and (2) gaps between motion predicted frames must be smaller than a second threshold (second period of time or second number of frames).

Figure 11:
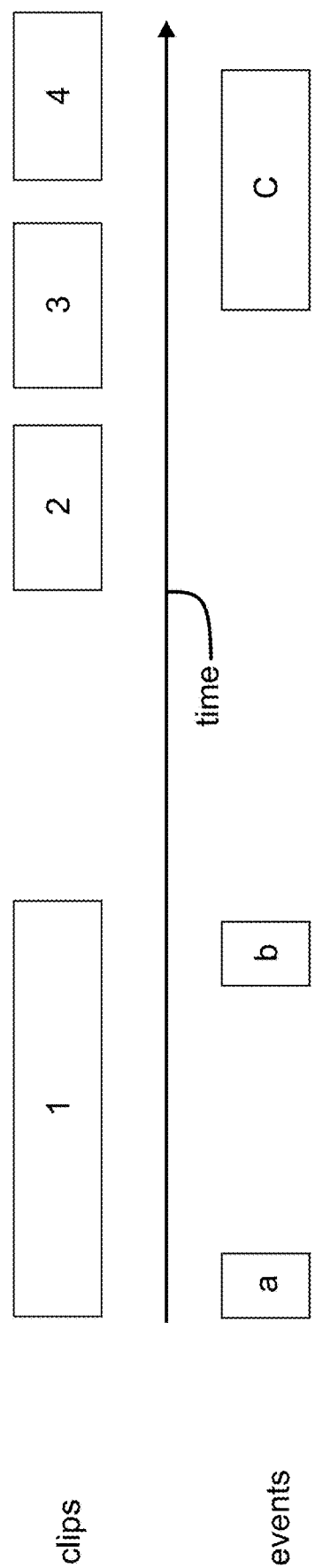
FIG. 11 illustrates an example of handling detected motion events in clips.
Figure 12:
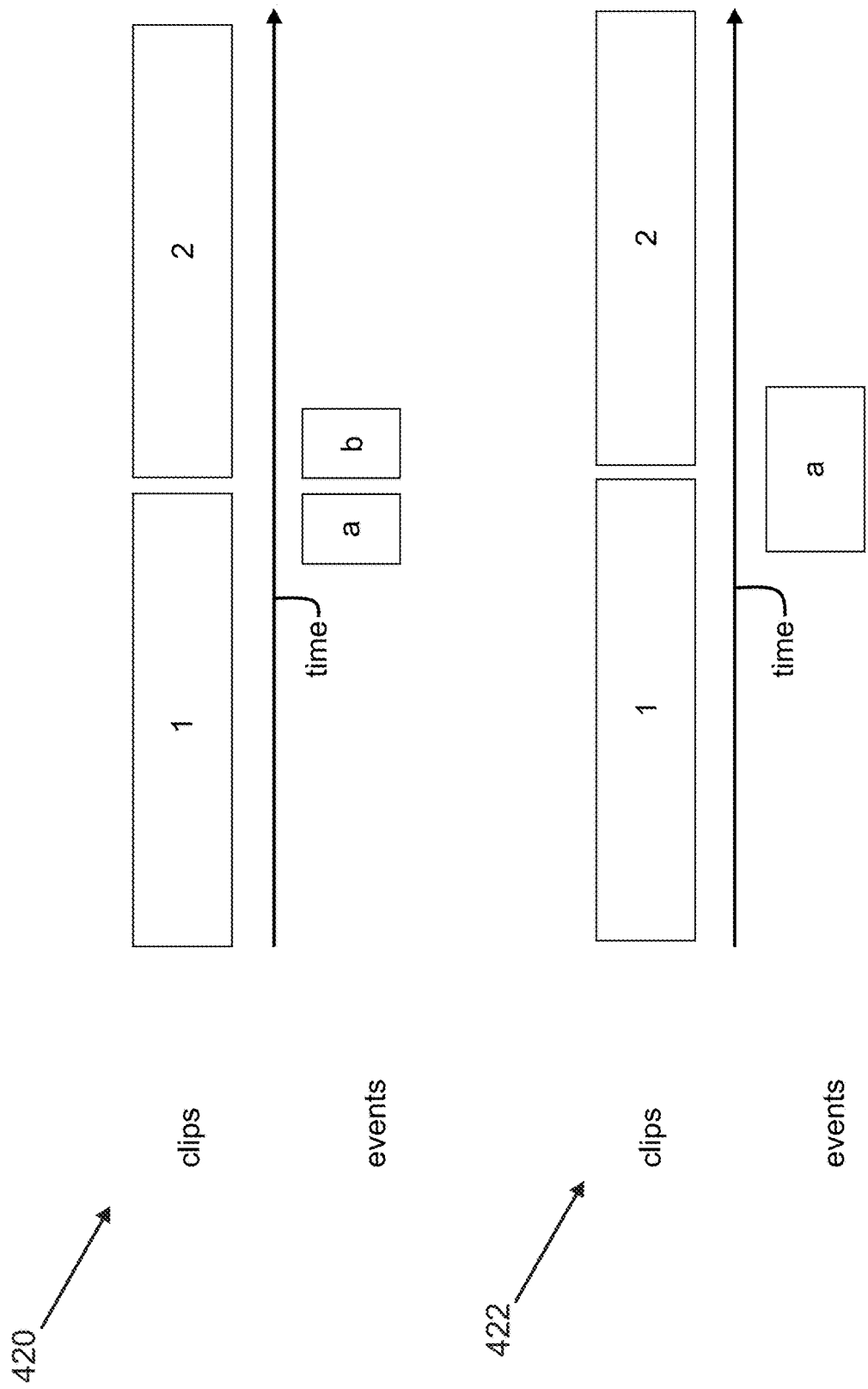
FIG. 12 illustrates examples of handling detected motion events in clips.

FIGS. 11 and 12 illustrate examples of detected events in clips. In some examples, the smart camera creates clips. These clips are analyzed to determine if motion occurred within the clip, and if so analyzed to determine the event boundaries. In some embodiments, these events are further processed to provide a user with an optimal video recording of the event. Events are contiguous blocks of time (or frames) that likely contain useful information. In some embodiments, clips are defined by the capabilities and implementation of the smart camera device. For example, a first smart camera device may record and upload 30-second clips and a second smart camera device may record and upload 1-minute clips. Accordingly, in some examples, the clips may contain zero or more events and the events may span one or more clips. An example user-interface 520 for a user to view events is illustrated and described in reference to FIG. 17.

Referring to FIG. 11, clip 1 is an example of a clip containing more than one event. In this example, clip 1 contains event A and event B. Also shown in this example is event C which spans clip 3 and clip 5. In some embodiments, users are provided events where the video provided to the user is processed and cropped to include the event. In other examples, users are provided clips which may contain annotations corresponding to the detected events.

FIG. 12 illustrates two different examples for handling events which span multiple clips. In example 420, event A and event B are detected (for example, using the method 250 illustrated and described in reference to FIG. 10). These events are then able to be accessed by the user. In example 422, the events detected in clip 1 and clip 2 are consolidated to a single event A.

FIGS. 13-17 illustrate various user-interfaces for a smart camera application on a user computing device. An example of the smart camera application 106 is illustrated and described in reference to FIG. 1. FIGS. 13-17 illustrate only a few example user-interfaces, many other user-interfaces are possible for a smart camera application in accordance with this disclosure.

Figure 13:
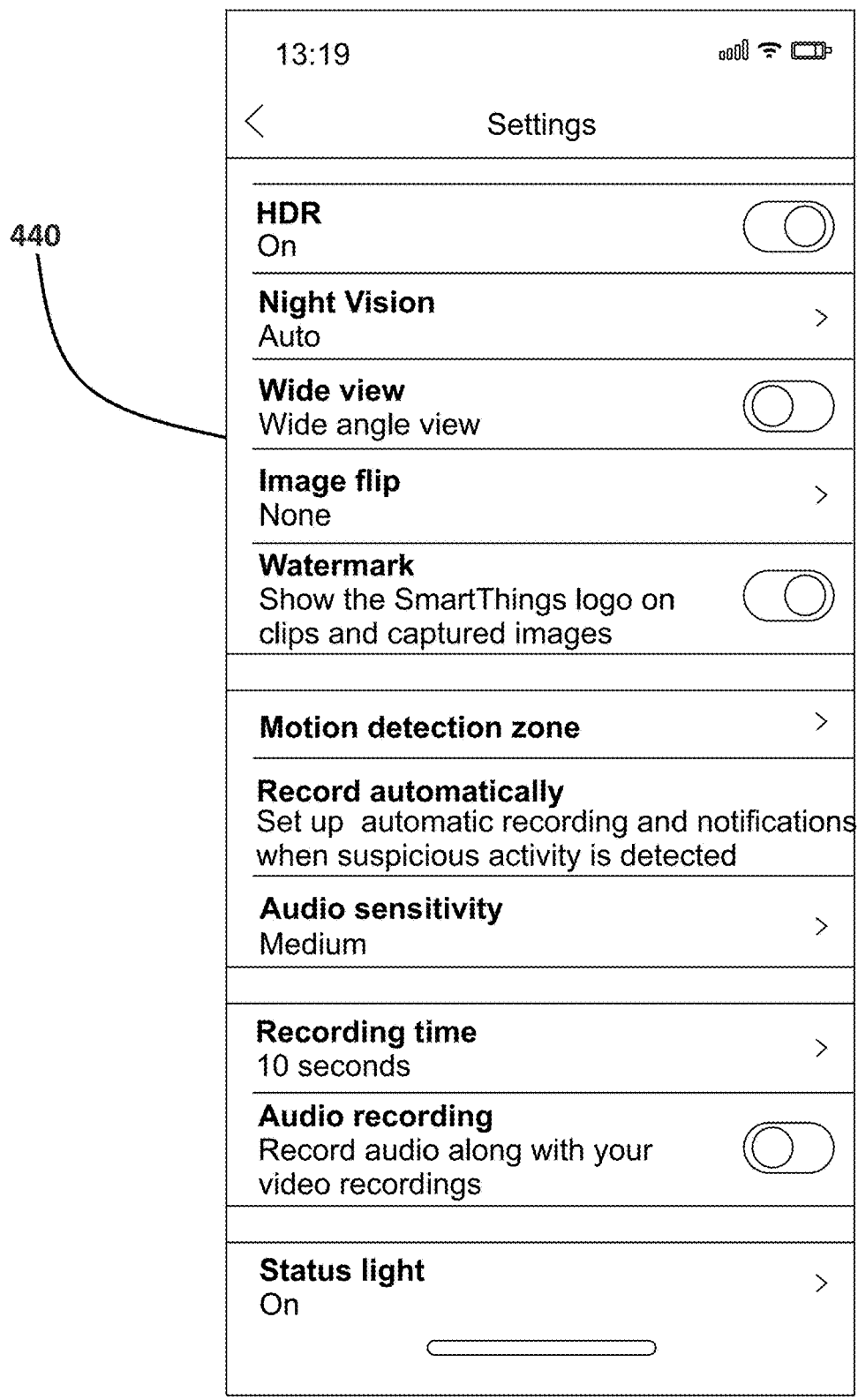
FIG. 13 illustrates an example user-interface for a smart camera application.

FIG. 13 illustrates a typical user-interface 440 for a smart camera application. The user-interface 440 illustrates a setting screen for a smart camera application. The setting screen includes selections for high-dynamic-range (HDR) recording, night vision, wide view, image flip, watermark, motion detection zone (an area of interest for motion detection), automatic recording when certain activities are detected, audio sensitivity, recording time, audio recording, status light etc. In some examples, when a user selects "record automatically", the user-interface 460 (illustrated in FIG. 14) is generated for the user.

Figure 14:
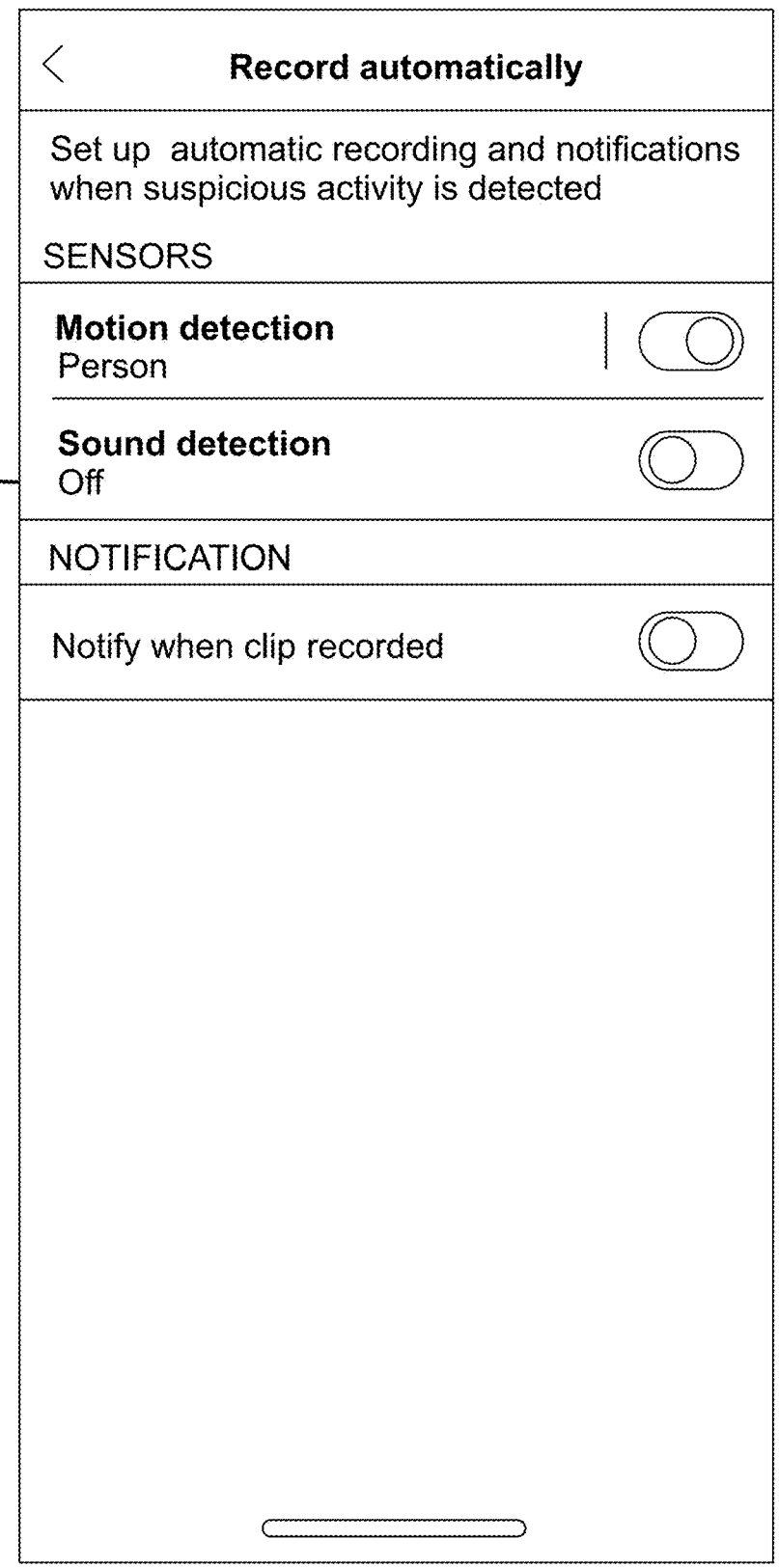
FIG. 14 illustrates another example user-interface for a smart camera application.

FIG. 14 illustrates a user-interface 460 for a smart camera application. The user-interface 460 allows a user to configure when video is recorded. In some examples, this configuration includes determining which sensors to use. In the example shown, the user-interface 460 includes the ability to enable motion detection and sound detection. The user interface also includes a configuration for enabling user notifications when clips are recorded.

Figure 15:
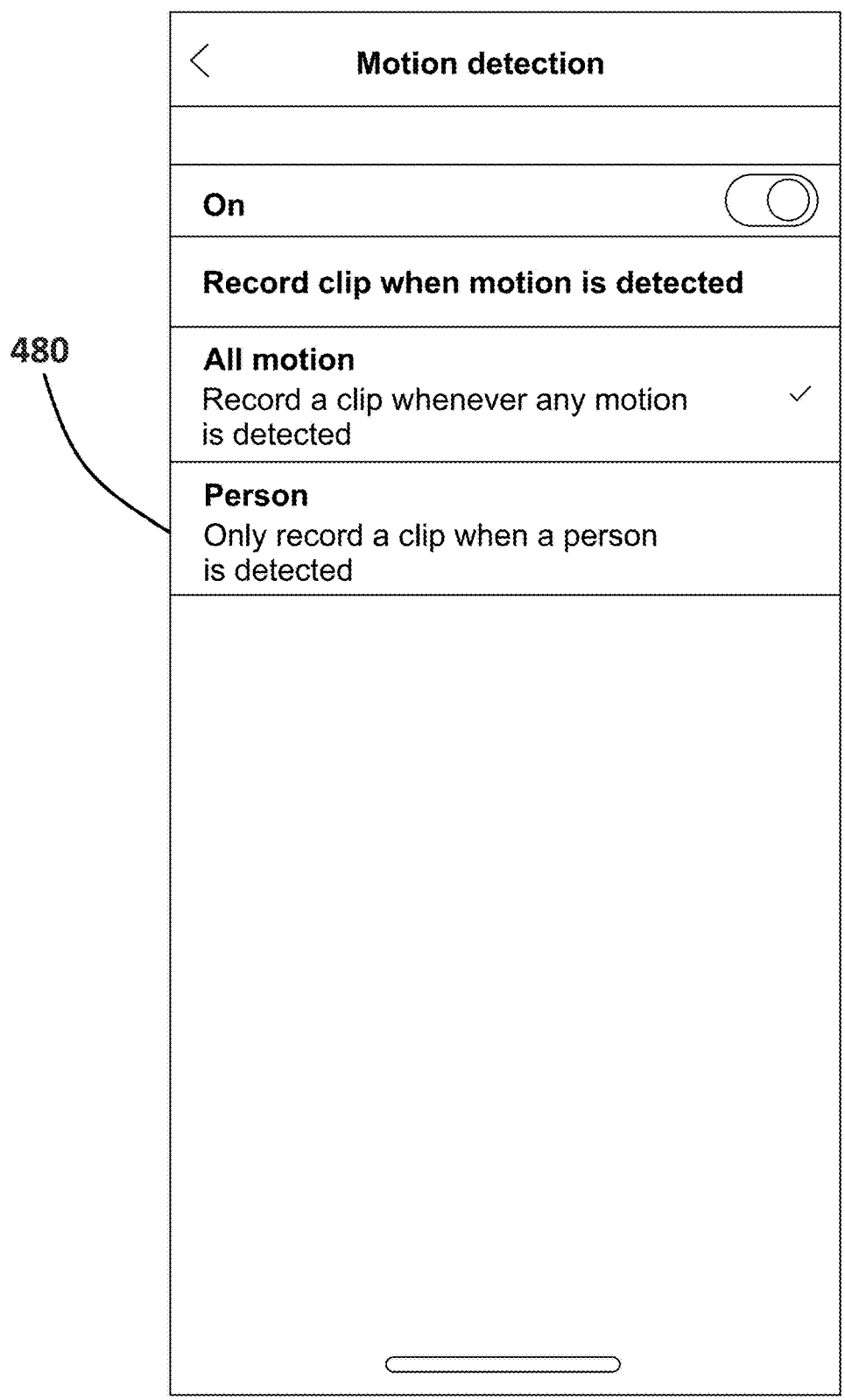
FIG. 15 illustrates another example user-interface for a smart camera application.

FIG. 15 illustrates a user-interface 480 for a smart camera application. The user-interface 480 shows settings for motion detection at the smart camera. A user selects a setting to enable the motion detection features (for example, the motion detection in the compressed video domain). Using the user-interface 480 when motion detection is enabled a user can select whether to record a clip when any motion is detected or only when a person is detected.

Figure 16:
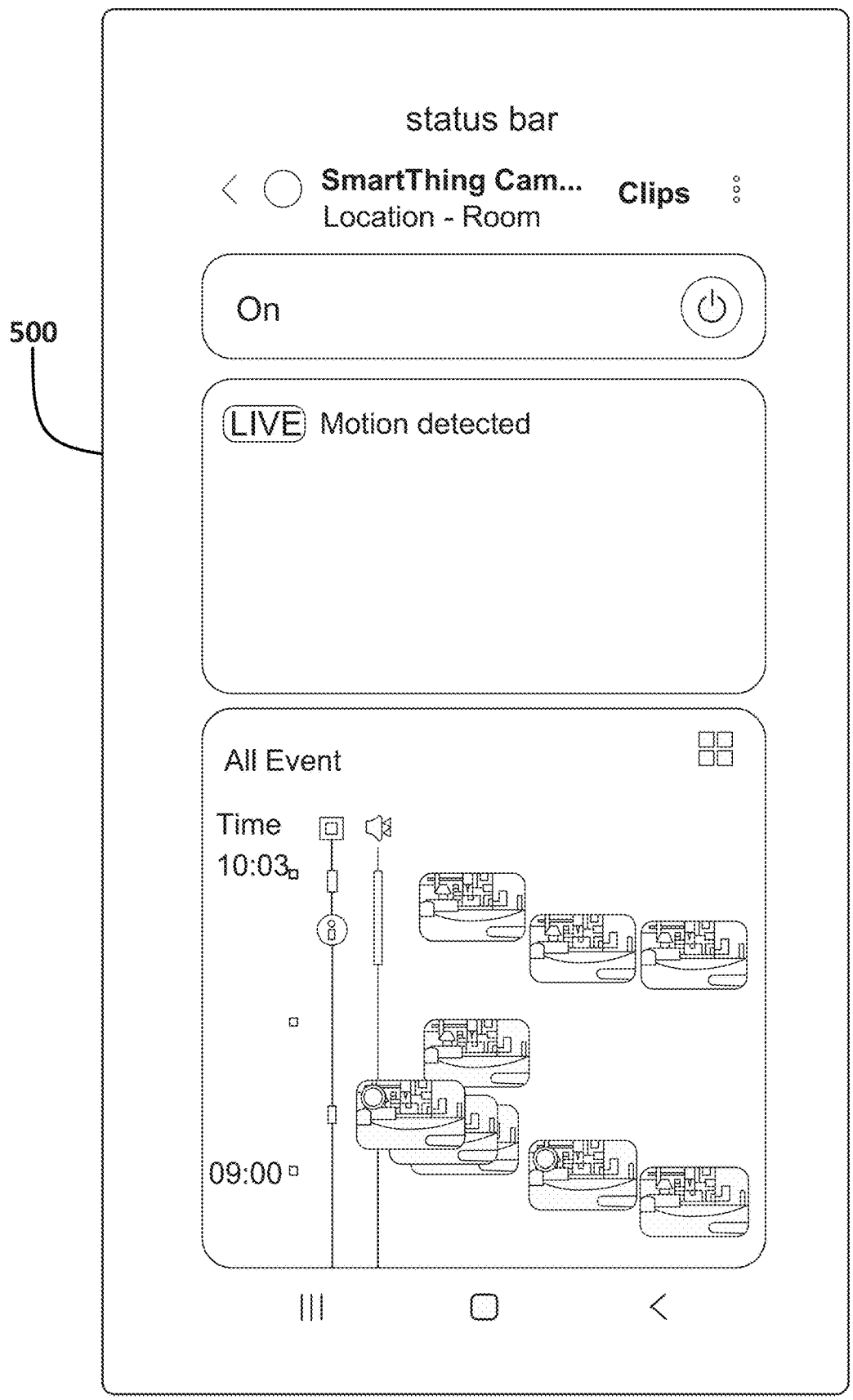
FIG. 16 illustrates another example user-interface for a smart camera application.

FIG. 16 illustrates a user-interface 500 for a smart camera application. The user-interface 500 allows a user to power on or power off the smart camera device, view a live stream from the smart camera device, and display a timeline of detected events with associated event clips. In some embodiments, a user can select one of the associated event clips thumbnails displayed on the timeline to play the associated clip.

Figure 17:
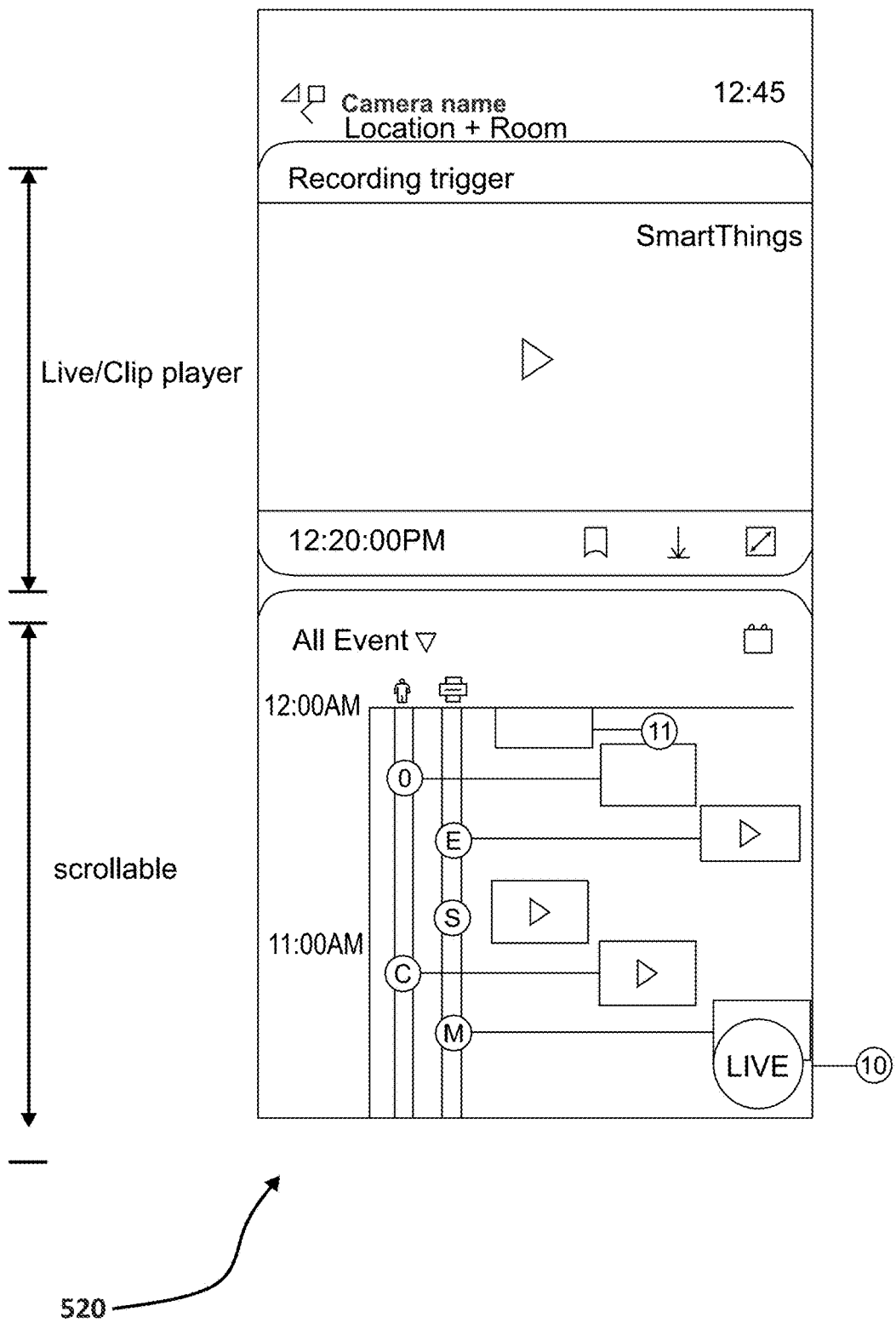
FIG. 17 illustrates another example user-interface for a smart camera application.

FIG. 17 illustrates a user-interface 520 for a smart camera application. The user-interface 520 includes: a camera identifier, a recording trigger, a viewer for the event video clip, selections for saving and downloading the clip, a selection for expanding the view, and an event timeline with selectable event clips (the timeline being scrollable). Also shown is a selection to start a live stream from the smart camera device.

Figure 18:
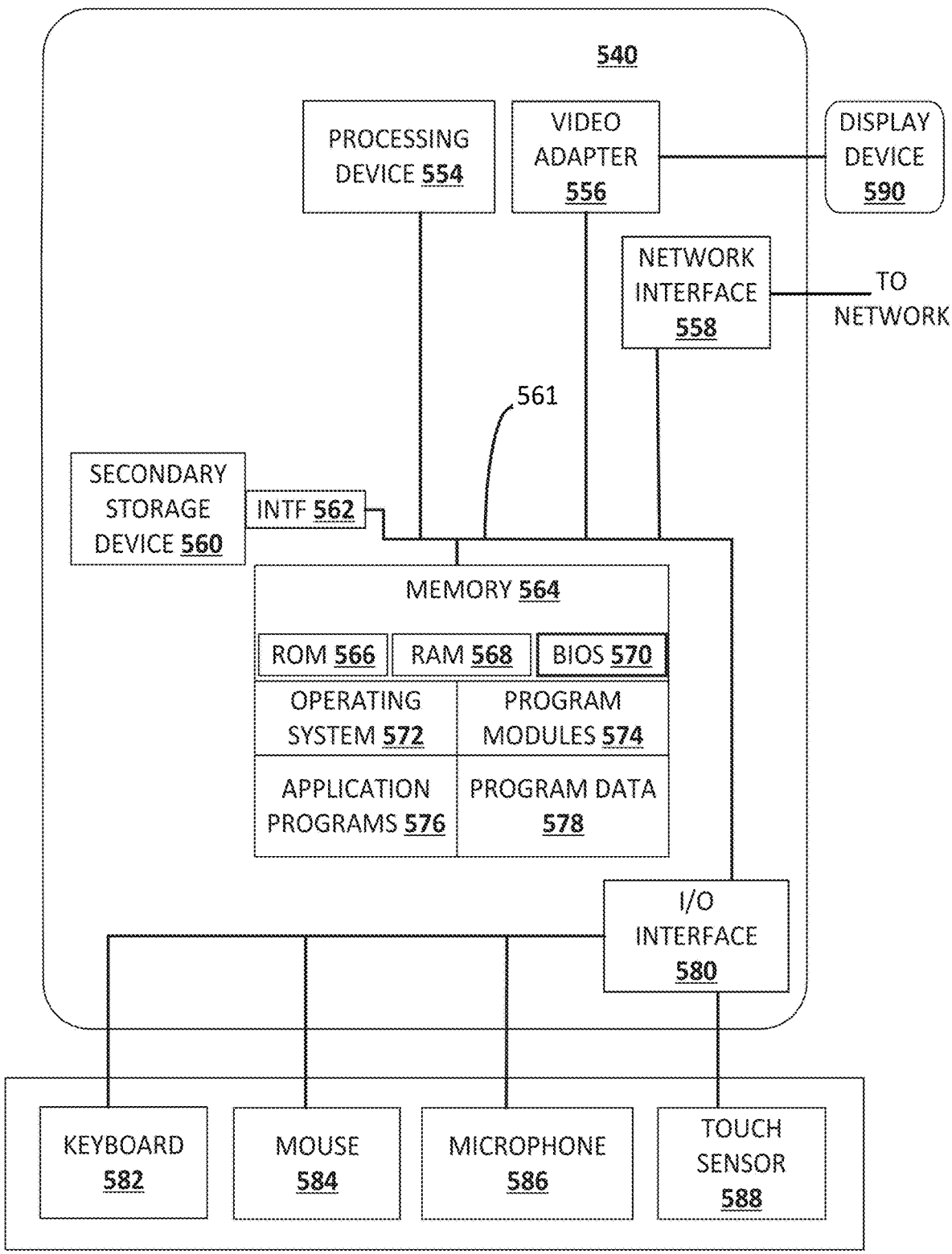
FIG. 18 illustrates an exemplary architecture of a computing device
Figure 19:
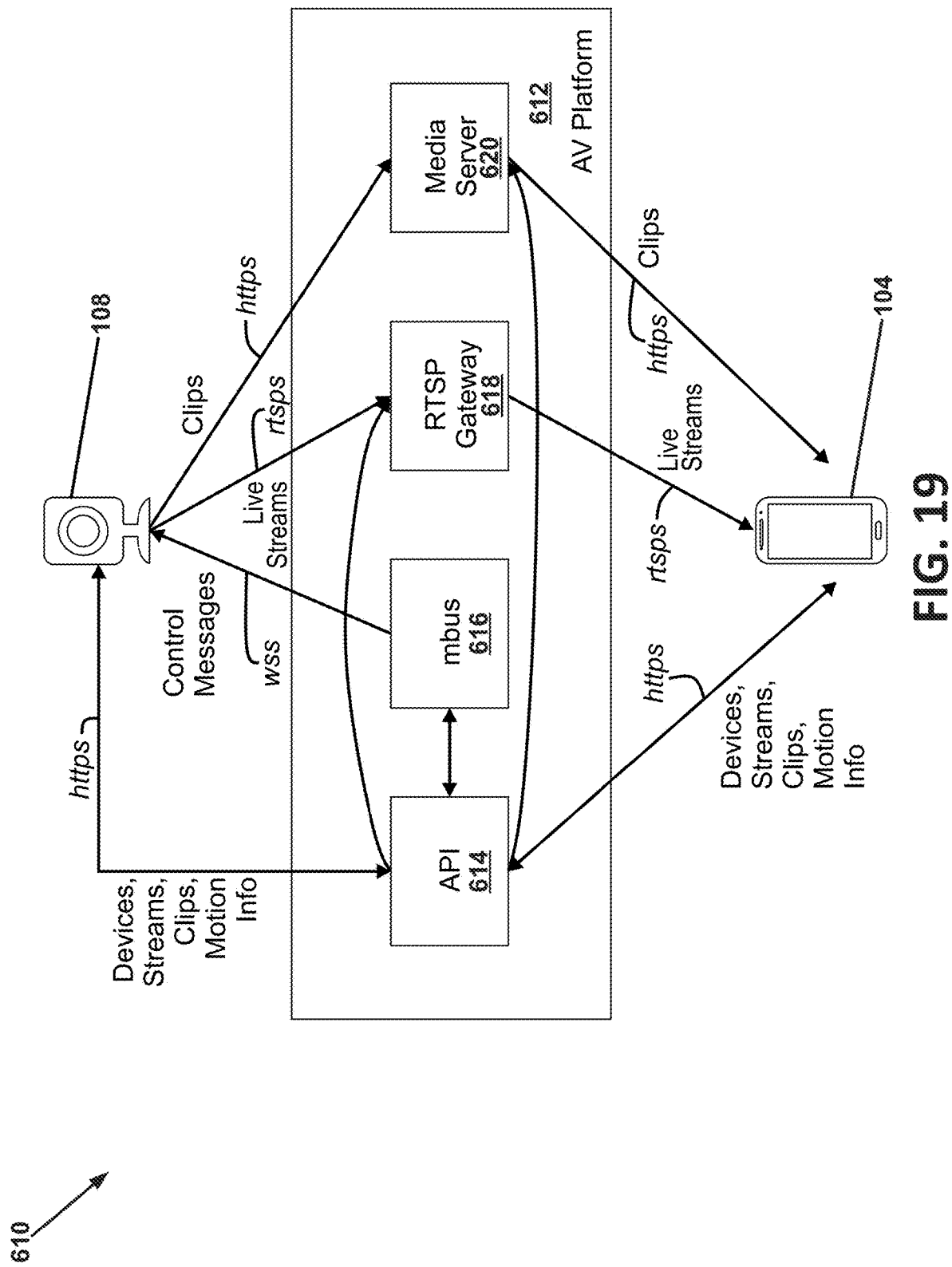
FIG. 19 illustrates an example environment for a smart camera device.

FIG. 18 illustrates an exemplary architecture of a computing device 540 which can be used to implement aspects of the present disclosure, including the user computing device 104 and the server 122. The computing device 540 is used to execute the operating system, application programs, and software modules (including software engines) described herein.

The memory 564 includes read only memory 566 and random-access memory 568. A basic input/output system 570 containing the basic routines that act to transfer information within computing device 540, such as during start up, is typically stored in the read only memory 566.

The computing device 540 also includes a secondary storage device 560 in some embodiments, such as a hard disk drive, for storing digital data. The secondary storage device 560 is connected to the system bus 561 by a secondary storage interface 562. The secondary storage devices 560 and their associated computer readable media provide nonvolatile storage of computer readable instructions (including application programs and program modules), data structures, and other data for the computing device 540.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 560 or memory 564, including an operating system 572, one or more application programs 576, other program modules 574 (such as the software described herein), and program data 578. The computing device 540 can utilize any suitable operating system.

In some embodiments, a user provides input to the computing device 503 through one or more input devices. Examples of input devices include a keyboard 582, mouse 584, microphone 586, and touch sensor 588 (such as a touchpad or touch sensitive display). Other embodiments include other input devices. The input devices are often connected to the processing device 554 through an input/output interface 580 that is coupled to the system bus 561. These input devices can be connected by any number of input/output interfaces, such as a parallel port, serial port, game port, or a universal serial bus. Wireless communication between input devices and the interface is possible as well, and includes infrared, Bluetooth® wireless technology, 802.11a/b/g/n, cellular, or other radio frequency communication systems in some possible embodiments.

In this example embodiment, a display device 590, such as a monitor, liquid crystal display device, projector, or touch sensitive display device, is also connected to the system bus 561 via an interface, such as a video adapter 556. In addition to the display device 590, the computing device 540 can include various other peripheral devices (not shown), such as speakers or a printer.

When used in a local area networking environment or a wide area networking environment (such as the Internet), the computing device 540 is typically connected to the network through a network interface 558, such as an Ethernet interface. Other possible embodiments use other communication devices. For example, some embodiments of the computing device 540 include a modem for communicating across the network.

The computing device 540 typically includes at least some form of computer readable media. Computer readable media includes any available media that can be accessed by the computing device 540. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 540.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

FIGS. 19-23 illustrate example system flow diagrams with an environment 610 for detecting motion at a smart camera device. The examples shown in FIGS. 19-23 are other examples of the environment 100 illustrated and described in reference to FIG. 1. The environment 610 includes a user computing device 104, a smart camera device 108, and an audio video (AV) platform 612.

Examples of the smart camera device 108 and user computing device are illustrated and described herein. For example, in FIGS. 1 and 2.

The AV platform 612 is a media streaming service. The AV platform is configured to provision cameras, provide streaming, and other smart camera services. Examples of features which can be included as part of the AV platform 612 include: hubless design, end-to-end encryption, flexible integration points, low latency live streaming, asynchronous message bus, integrated metrics and tracing, and media viewers targeting Android, iOS, Linux, Microsoft Windows, and other browser platforms. Additionally, the AV platform may be partner agnostic (e.g., may work with any variety of smart camera devices and user computing devices, software platforms etc.). In some embodiments, the AV platform includes an API 614, an mbus 616, an RTSP gateway 618, and a media server 620.

The API 614 is an application programming interface. In some embodiments, the API 614 is a RESTful Web API. The API 614 operates to provide services to clients and devices to interact with the AV platform 612. In some embodiments, the smart camera device 108 and the user computing device 105 communicate with the AV platform 612 using a hypertext transfer protocol (HTTP/HTTPS). Other protocols can also be used. The smart camera device 108 and the user computing device 104 are able to request or provide devices, streams, clips, and motion information to the AV platform 612 using the API 614.

The mbus 616 is a messaging service. In some embodiments, the mbus 616 is a real-time distributed messaging service. In some embodiments, the smart camera device 108 is a web socket protocol (e.g., WSS) to communicate with the mbus 616 messaging service.

The RTSP gateway 618 is a real time streaming protocol (RTSP) gateway server. The RTSP gateway 618 operates to relay video streams from the smart camera device 108 to the user computing device 104. The RTSP gateway 618 utilizes the real time streaming protocol to provide the live streams from the smart camera device 108 to the user computing device 104.

The media server 620 is a server for performing various services described herein. In some embodiments, the media server 620 stores video clips and images. In some embodiments, the smart camera device 108 and the user computing device 104 use a hypertext transfer protocol (HTTP/HTTPS) to communicate/access the media server 620.

Figure 20:
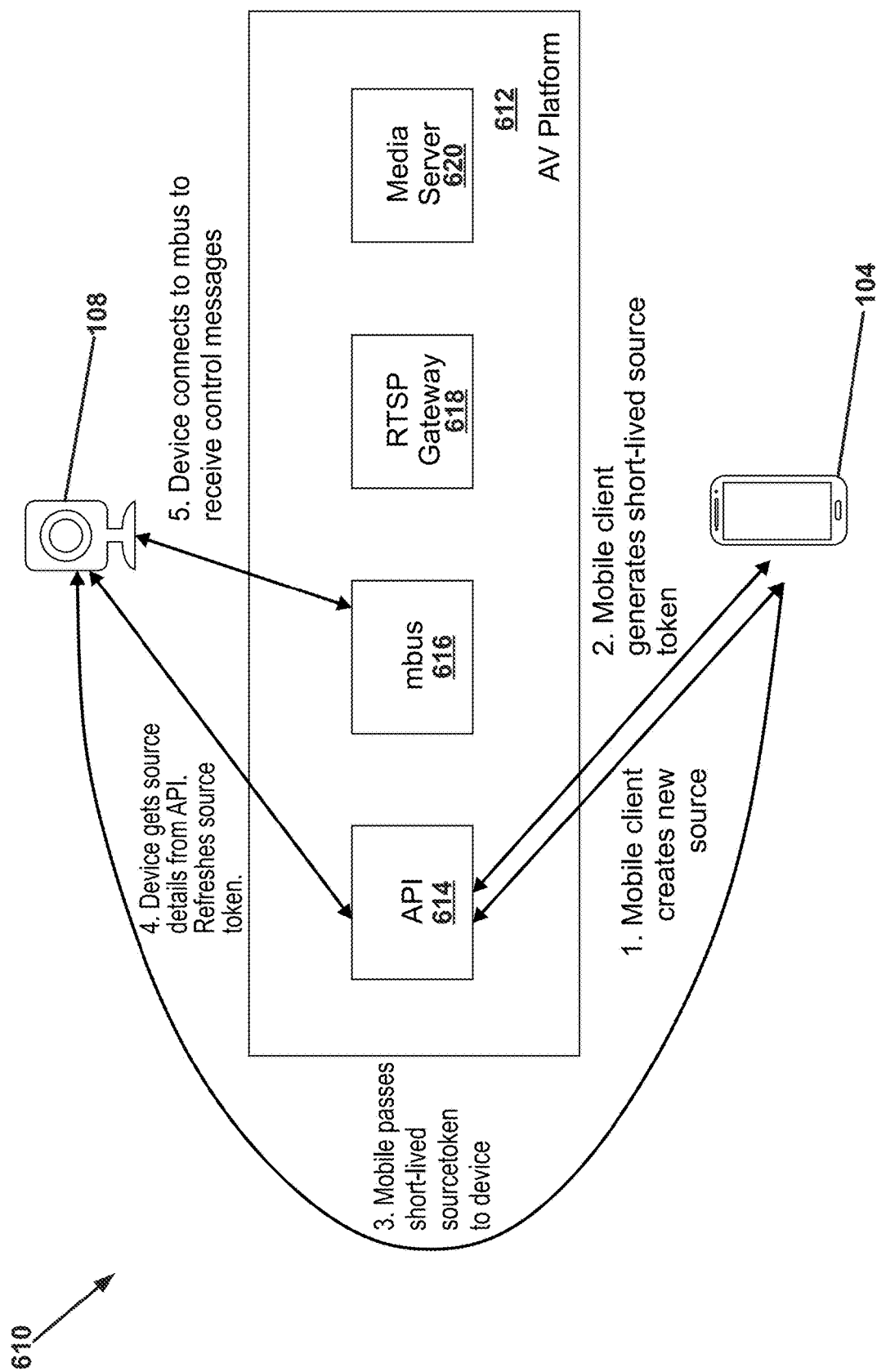
FIG. 20 illustrates a system flow diagram of a method for provisioning a smart camera device.

FIG. 20 illustrates a system flow diagram of the method for provisioning a smart camera device. In some embodiments, the method for provisioning depends on the smart camera device. In a typical example, the user computing device 104 is responsible for creating a new source in the AV platform 612 and passing information to the smart camera device 108 for authentication with the AV platform 612. In the example shown, device provision includes: (1) the user computing device 104 creating a new source at the AV platform 612 using the API 614; (2) the user computing device 104 generating a short-lived source token; (3) the user computing device 104 sending the short-lived source token to the smart camera device 108; (4) The smart camera device 108 receiving source details from the API 614 and refreshing the source token; and (5) the smart camera device 108 connecting to mbus 616 to receive control messages.

Figure 21:
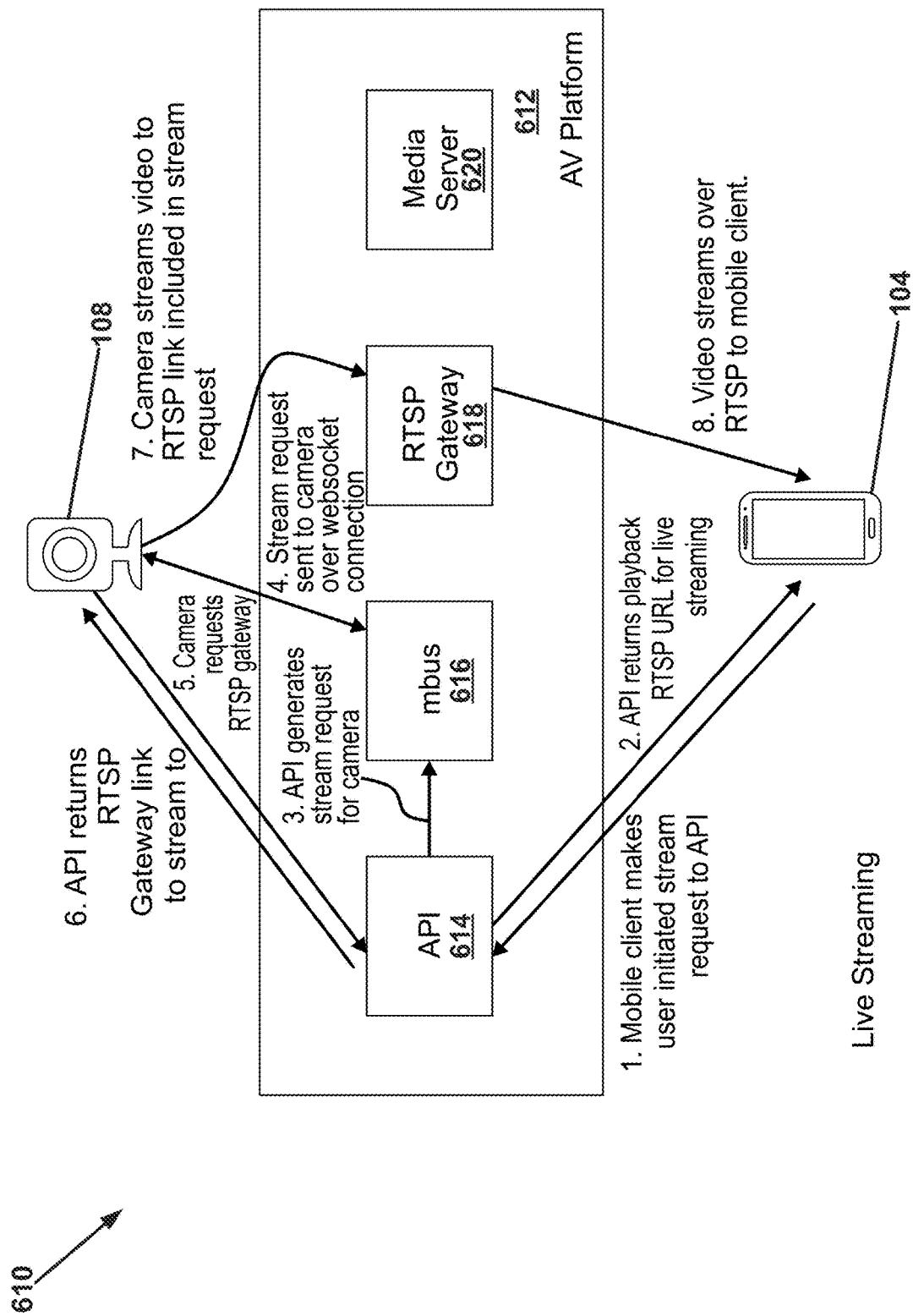
FIG. 21 illustrates a system flow diagram of a method for live streaming from a smart camera device.

FIG. 21 illustrates a system flow diagram of a method for live streaming from a smart camera device 108. In typical embodiments, a stream of media is provided by the RTSP gateway 618. In some embodiments, the stream can be accessed by zero or more clients and zero or more cloud consumers. In some embodiments, the video data is encrypted using transport layer security (TLS). In the embodiment shown, the method for live streaming includes: (1) the user computing device 104 making a stream request to the API 614; (2) the user computing device 104 receiving a playback RTSP URL from the API 614; (3) the API 614 generate a stream request from the camera via the mbus 616; (4) the mbus 616 sending a message to the smart camera device 108 over a websocket connection; (5) the smart camera device 108 requesting an RTSP gateway from the API 614; (6) the smart camera device 108 receiving an RTSP gateway link from the API 614; (7) the smart camera device streaming video to the RTSP link via the RTSP gateway 618; and (8) the user computing device 104 receiving video streams from the RTSP gateway 618.

Figure 22:
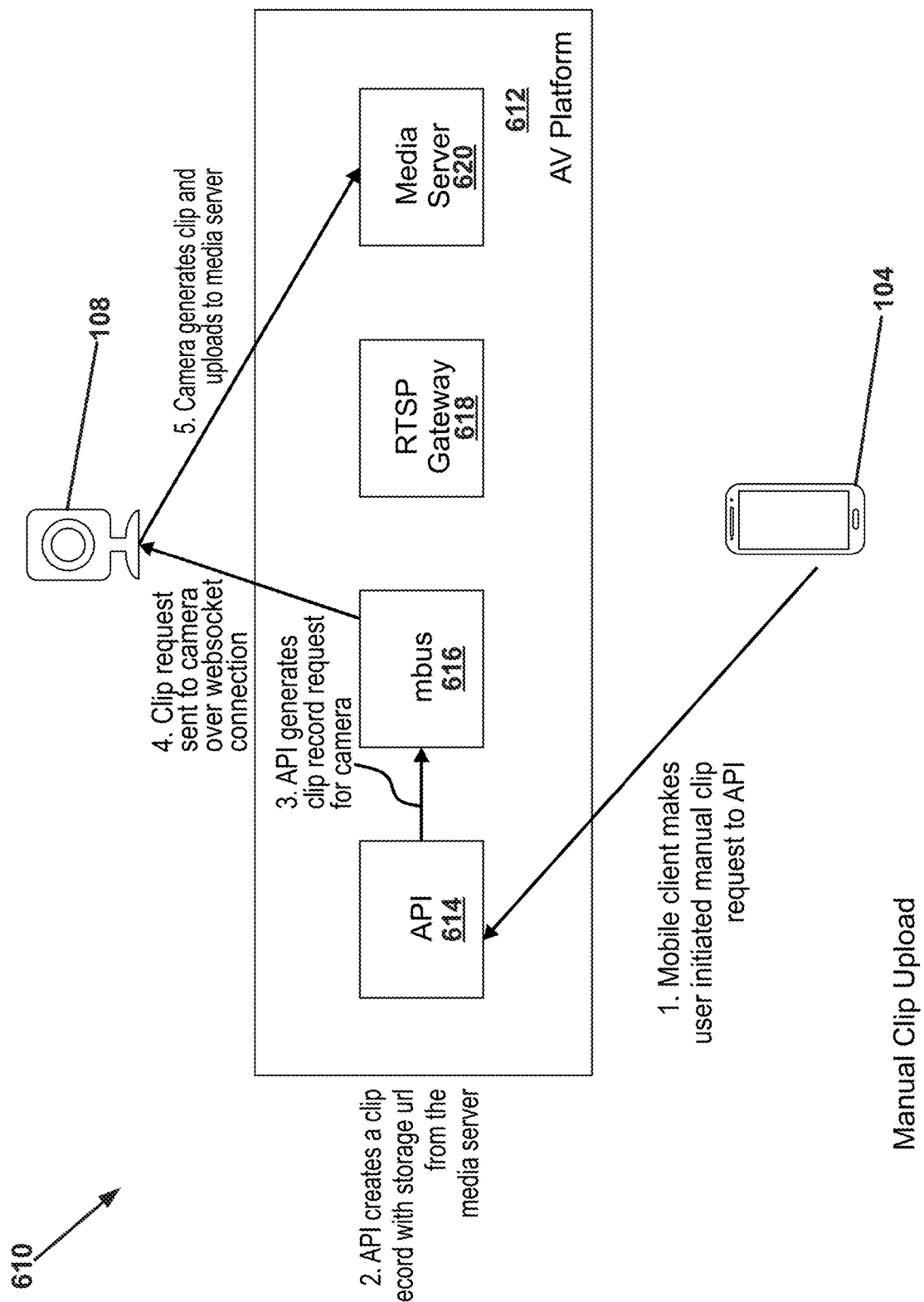
FIG. 22 illustrates a system flow diagram of a method for manually uploading a clip from a smart camera device.
Figure 23:
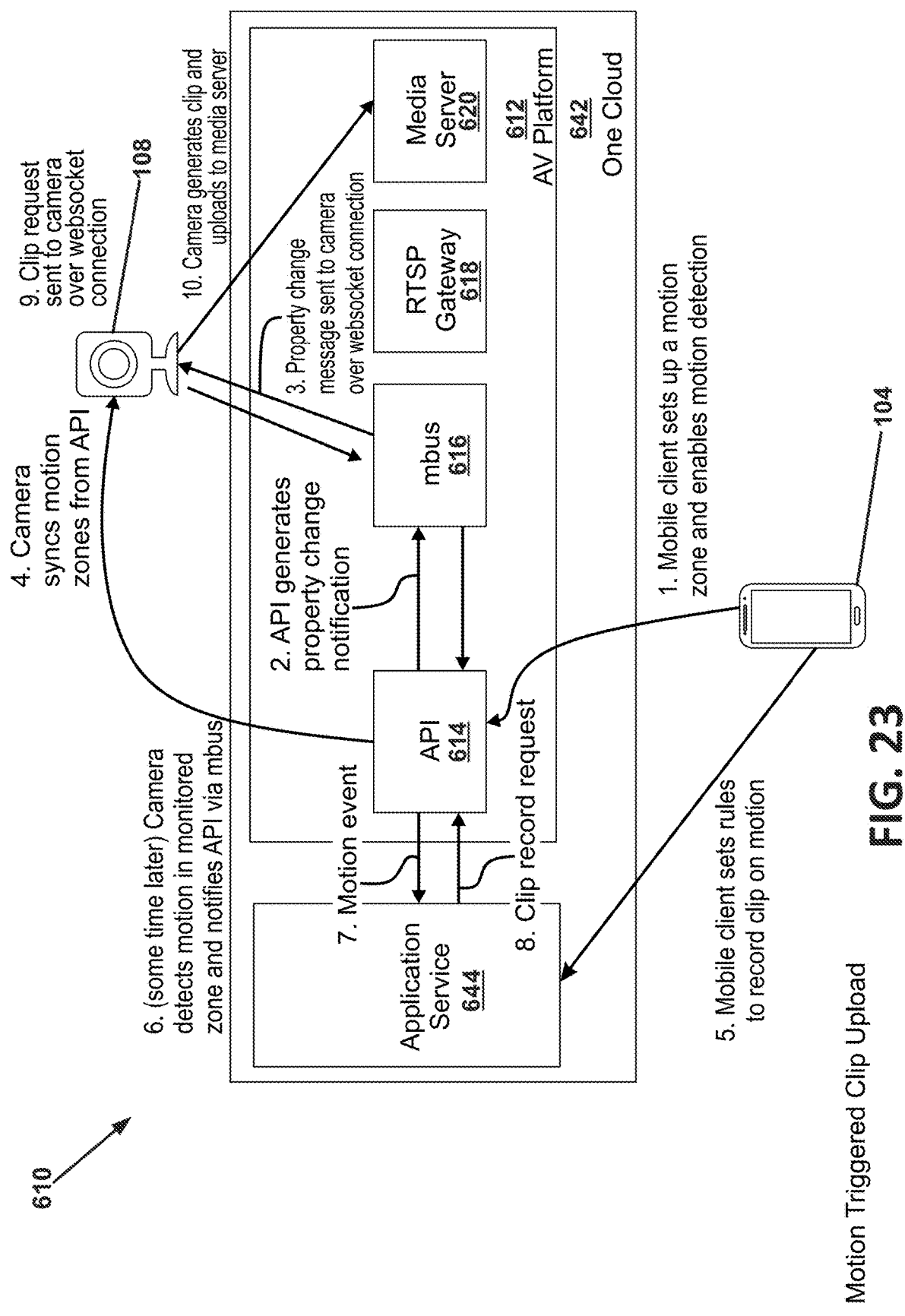
FIG. 23 illustrates a system flow diagram of a method for using motion detection to trigger a clip upload from a smart camera device.

FIGS. 22 and 23 illustrate system flow diagrams for uploading a clip from a smart camera device.

FIG. 22 illustrates a system flow diagram of a method for manually uploading a clip from a smart camera device. In the embodiment shown, the method includes: (1) the user computing device 104 sending a manual clip request to the API 614; (2) the API 614 creates a clip record with a storage URL from the media server; (3) the API generates a clip record request for the smart camera device 108 via the mbus 616; (4) the mbus 616 sends the smart camera device 108 a clip request over a websocket connection; and (5) the smart camera device 108 generates a clip and uploads the clip to the media server 620.

FIG. 23 illustrates a system flow diagram of a method for using motion detection to trigger a clip upload from a smart camera device. The system illustrated in FIG. 23 further includes a one cloud 642 which operates the AV platform 612 and an application service 644 provides specialized services for a smart camera device. For example, the application service 644 may provide backend home security service, motion detection services, event detection services, or other services including the services described herein. The one cloud 642 can be any cloud computing system, or computing system (including systems with specialized services, specialized hardware, and redundancy). The Application service In the embodiment shown, the method includes: (1) the user computing device 104 sets up a motion zone and enables motion detection (e.g., with the user the user-interface 480 illustrated and described in reference to FIG. 15) with the API 614; (2) the API 614 generates a property change notification; (3) the property change message is sent to the camera over a websocket connection via the mbus 616; (4) the smart camera device 108 sync motion zones from the API 614; (5) the user computing device 104 sets up rules to record clips based on detected motion with the application service 644 (6) the smart camera device 108 detects motion (e.g., using the motion detection engine 202);(7) a motion event is detected at the application service 644 (e.g., using the event detection engine 204, (8) the application service 644 sends a record request to the AV platform 612 using the API 614; (9) the clip request is received at the smart camera device 108; and (10) the smart camera device 108 generates a clip and uploads the clip to the media server 620.

Figure 24:
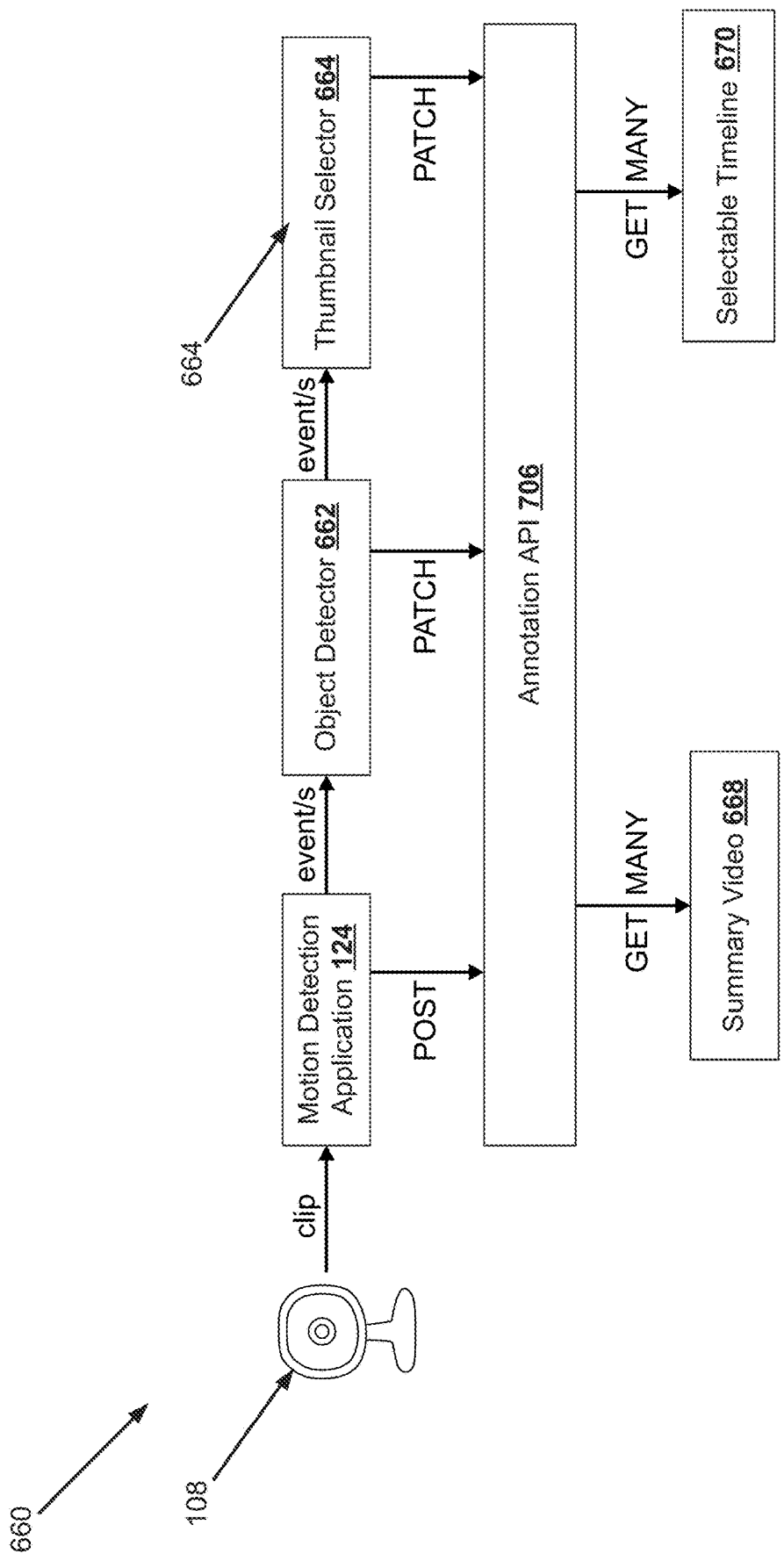
FIG. 24 illustrates an example system flow diagram of a method for providing video clips of events to users.

FIG. 24 illustrates a system flow diagram of a method 660 for providing video clips with annotations to a user. The smart camera device 180 provides a clip of compressed video data to the motion detection application 124. The motion detection application 124 processes the compressed video data to determine whether the clip contains relevant motion and determine event boundaries. The event boundaries are posted to the annotation API 706. Next the objects are detected in the clip between the event boundaries using the object detector 662. After the object detector 662 has processed the video clip a thumbnail is selected by the thumbnail selector 664. The objects detected by the object detector 662 and the thumbnail selected by the thumbnail selector 664 are provided to the annotation API 706. In some embodiments, the object detector 662 and thumbnail selector 664 are downstream processes which have additional computation requirements. For example, in some embodiments, the object detector 662 and thumbnail selector require a decoder to decode the compressed video.

The annotation API 706 compiles the video clips of the events, the detected object(s) and the thumbnail(s) selected and generates and provides an output which is accessible to a user. One example output is a summary video 668 which is a single video summarizing an event, a predetermined period of time (overnight summary, morning summary, afternoon summary, day summary, week summary, etc.) The summary video 668 can comprise a single event or a series of events which happen over the predetermined time. Another example output is a selectable timeline 670. The selectable timeline provides a user with a timeline which includes one or selectable events displayed along a timeline. For example, the timeline may cover a week and include selectable events for one or more days during the week. An example of a selectable timeline within a user-interface is illustrated and described in reference to FIGS. 16 and 17.

Figure 25:
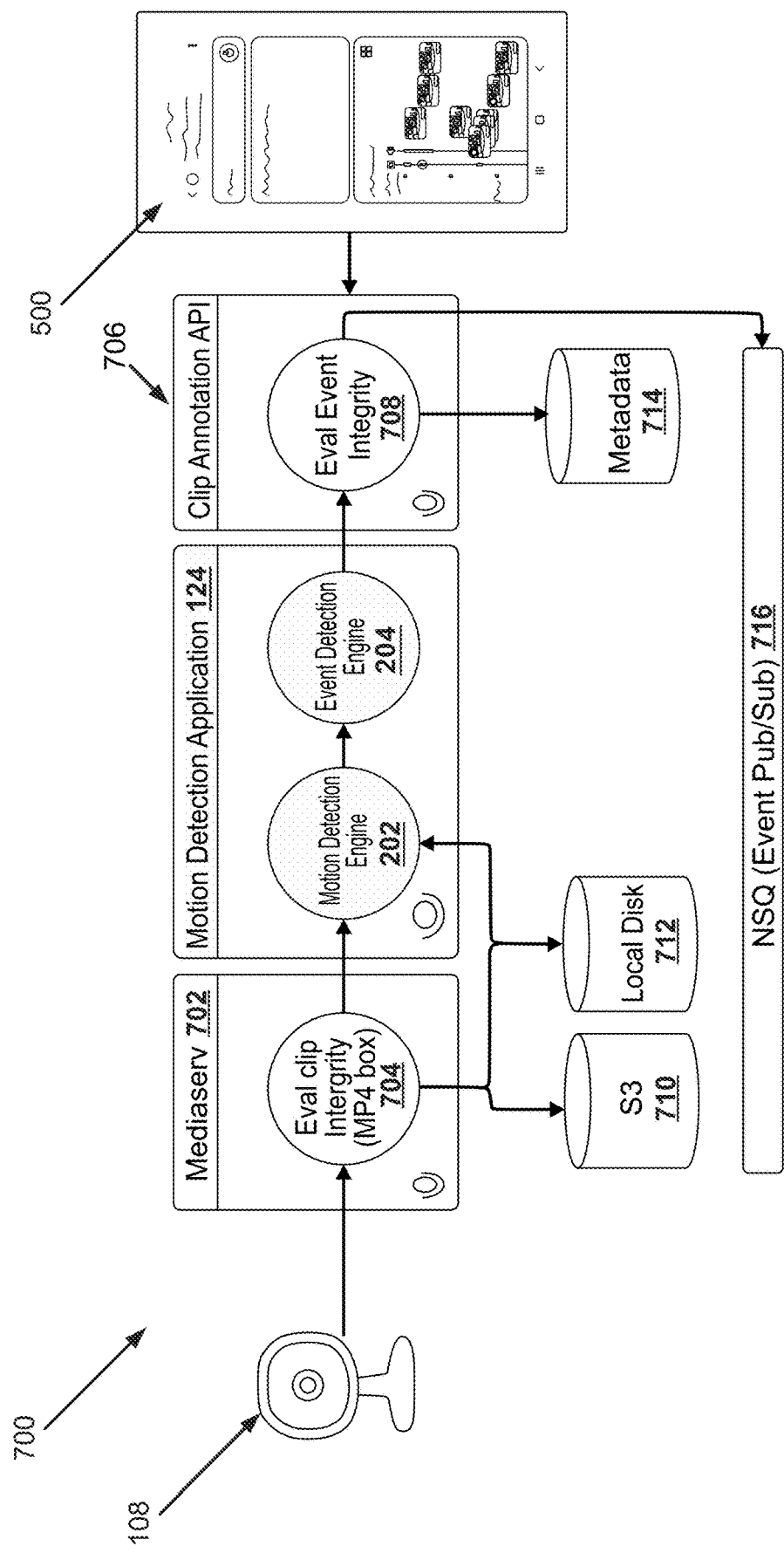
FIG. 25 illustrates another example system flow diagram of another method for providing video clips of events to users.

FIG. 25 illustrates a system flow diagram of a method 700 for providing video clips to a user. The system-flow diagram illustrated in FIG. 25 includes a smart camera device 108 a media service 702 with an evaluation clip integrity application 704, a motion detection application 124 with a motion detection engine 202 and an event detection engine 204, an annotation API 706 with an evaluation event integrity application 708, a server 710, a local disk 712, a metadata server 714, a publishing service 716 and a user-interface 500. FIG. 25 illustrates a flow diagram in a cloud-based scenario.

Examples of the smart camera device are 108 are illustrated and described in reference to FIGS. 1 and 2. The camera captures video data as clips which are compressed and provided to the media service 702.

The media service 702 interfaces with the smart camera device 108. The media service receives compressed video data from the smart camera device 108. The media service 702 includes an evaluation clip integrity application 704 which checks the compressed video data (typically a clip of compressed video data) for integrity issues (e.g., for corrupted data or low quality images). After the compressed video data passes the integrity check the compressed video data is stored in the server 710 and the local disk 712. The server 710 stores the compressed video data for storage. The local disk 712 stores the compressed video data so it can be processed by the motion detection application 124.

Examples of the motion detection application 124 with the motion detection engine 202 and the event detection engine 204 are illustrated and described in reference to FIG. 3. The motion detection application 124 first filters the compressed video data to remove clips without any relevant motion using the motion detection engine 202. The clips with relevant motion are processed by the event detection engine which detects event boundaries and processes the clips to create a video clip of the event. The video clip of the event is provided to the annotation API 706.

An example of the annotation API 706 is illustrated and described in reference to FIG. 24. The annotations AI includes evaluation event integrity application 708. The evaluation event integrity application 708 processes the video clip of the event to check that the video clip of the event meets integrity standards. The annotation API 706 further stores the annotations for the video clip of the event in a metadata server 714. After the video clip of the event has completed to processing pipeline the publishing service 716 publishes the event with the annotations and the video clip of the event to authenticated users with access. In some examples, the video clip of the event is published in a timeline of events.

The user-interface 500 is an example user-interface for a user to view published events. An example of the user-interface 500 is illustrated and described in reference to FIG. 16.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method comprising:
receiving compressed video data;
extracting macroblocks and motion vectors for a plurality of frames in the compressed video data;
identifying frame-level features for each of the plurality of frames based on the macroblocks and the motion vectors;
calculating similarity features for each of the identified frame-level features based on the frame-level features identified in consecutive frames;
predicting motion for each of the plurality of frames by providing the frame-level features and the similarity features into a model trained to detect motion; and
predicting event boundaries in the compressed video data by providing the frame-level features into a second model trained to identify event boundaries.

2. The method of claim 1, wherein the plurality of frames is a sampled subset of frames in the video data and the consecutive frames are consecutive in the sampled subset of frames.

3. The method of claim 1, wherein the plurality of frames includes every frame in the compressed video data.

4. The method of claim 1, wherein predicting motion in the compressed video data further comprises smoothing the predicted motion over a time window.

5. The method of claim 1, wherein predicting the event boundaries further comprises smoothing the predicted event boundaries for the purpose of event boundary prediction over a second time window.

6. The method of claim 1, the method further comprising:
grouping at least some of the plurality of frames into an event based on:
(1) a predicted length of the event being over a threshold; and
(2) a gap between frames with detected motion being below a second threshold.

7. The method of claim 6, the method further comprising:
providing a video clip of the event to a computing device, the computing device generating a user-interface to view the video clip.

8. The method of claims 1, wherein the model trained to detect motion is a random forest model trained on frame-level features.

9. The method of claim 1, wherein the second model is a random forest model trained on event-level features.

10. The method of claim 1, wherein the model is trained by:
receiving training video data;
labeling the training video data by annotating the training video data with bounding boxes around objects that are in motion and assigning each frame in the training video data with a binary contain motion value;
training the model with the labeled training video data; and
validating the model.

11. The method of claim 1, wherein the frame-level features include:
(1) at least one motion vector related feature; and/or
(2) at least one macroblock type feature.

12. The method of claims 1, wherein the consecutive frames include previous frames and next frames.

13. The method of claim 12, wherein calculating the similarity features further comprises:
- calculating similarity-previous features based on the frame-level features identified in the previous frames;
- calculating similarity-next features based on the frame-level features identified in the next frames;
- calculating similarity-previous-next features based on the frame-level features identified in the previous frames and the frame-level features identified in the next frames; and
- calculating the similarity features by obtaining a mean of the similarity-previous features, the similarity next features; and the similarity-previous-next features.

14. The method of claim 12, wherein a frame buffer includes a predetermined window size, the next frames including the predetermined window size number of next frames and the previous frames including the predetermined window size number of previous frames.

15. One or more non-transitory computer-readable storage devices storing data instructions that, when executed by at least one processing device of a system, cause the system to:
- receive compressed video data;
- extract macroblocks and motion vectors for a plurality of frames in the compressed video data;
- identify frame-level features for each of the plurality of frames based on the macroblocks and the motion vectors;
- calculate similarity features for each of the identified frame-level features based on the frame-level features identified in consecutive frames;
- predict motion for each of the plurality of frames by providing the frame-level features and the similarity features into a model trained to detect motion; and
- predict event boundaries in the compressed video data by providing the frame-level features into a second model trained to identify event boundaries.

16. A smart camera device, the smart camera device comprising:
- a processor; and
- a memory storage device, the memory storage device storing instructions that, when executed by the processor, cause the smart camera device to:
  receive compressed video data;
  extract macroblocks and motion vectors for a plurality of frames in the compressed video data;
  identify frame-level features for each of the plurality of frames based on the macroblocks and the motion vectors;
  calculate similarity features for each of the identified frame-level features based on the frame-level features identified in consecutive frames;
  predict motion for each of the plurality of frames by providing the frame-level features and the similarity features into a model trained to detect motion; and
  predict event boundaries in the compressed video data by providing the frame-level features into a second model trained to identify event boundaries.

17. The smart camera device of claim 16, wherein a video clip of an event is generated based on the event boundaries and is provided to a user device.

* * * * *